United States Patent
Draznin et al.

(10) Patent No.: US 11,876,683 B2
(45) Date of Patent: Jan. 16, 2024

(54) NETWORK FUNCTIONS DELIVERY SYSTEM FOR MOBILE NETWORKS

(71) Applicant: Microsoft Technology Licensing, LLC, Redmond, WA (US)

(72) Inventors: Sagiv Draznin, Walnut Creek, CA (US); Ashwin Moranganti, South Grafton, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/750,326

(22) Filed: May 21, 2022

(65) Prior Publication Data
US 2023/0379221 A1 Nov. 23, 2023

(51) Int. Cl.
G06F 15/173 (2006.01)
H04L 41/122 (2022.01)
H04L 41/084 (2022.01)
H04L 41/0895 (2022.01)

(52) U.S. Cl.
CPC .......... *H04L 41/122* (2022.05); *H04L 41/084* (2013.01); *H04L 41/0895* (2022.05)

(58) Field of Classification Search
CPC .. H04L 41/122; H04L 41/084; H04L 41/0895
See application file for complete search history.

(56) References Cited

U.S. PATENT DOCUMENTS

| | | | |
|---|---|---|---|
| 2021/0135957 A1 | 5/2021 | Thakkar et al. | |
| 2021/0203550 A1* | 7/2021 | Thakkar | H04L 41/0895 |
| 2022/0116445 A1* | 4/2022 | Filippou | H04L 41/0853 |
| 2022/0311673 A1* | 9/2022 | Zu | H04L 41/122 |

FOREIGN PATENT DOCUMENTS

| | | | | |
|---|---|---|---|---|
| WO | WO-2020185794 A1 * | 9/2020 | ......... | H04L 41/0853 |
| WO | WO-2021151514 A1 * | 8/2021 | ......... | H04L 41/0803 |

OTHER PUBLICATIONS

"IFA 034—Actors, roles and description of operational flows", In Etsi Draft; Nfvifa(18)000770, European Telecommunications Standards Institute, Sep. 5, 2018, 7 Pages.

(Continued)

*Primary Examiner* — Richard G Keehn

(74) *Attorney, Agent, or Firm* — Mark K. Young; Mark Young PC

(57) ABSTRACT

A network functions delivery system provides customers representing mobile network and enterprise operators with an online repository for virtualized network functions (VNFs) that are available from multiple VNF vendors and operable across infrastructure underlying the customer's mobile network including diverse private, public, and hybrid cloud platforms. The network functions delivery system provides a user interface exposing a catalog of VNFs offering differentiated performance across a range of categories of access network functions and core network functions from which the customer can compare VNF features and capabilities, associated technical requirements, and applicable commercial terms.

20 Claims, 25 Drawing Sheets

(56) References Cited

OTHER PUBLICATIONS

"Network Functions Virtualisation (NFV) Release 2; Protocols and Data Models; VNF Package specification", In Etsi Goup Specification, European Telecommunications Standards Institute, Jul. 2017, 17 Pages.

Gardikis, et al., "NFV Applicability and use Cases in Satellite Networks", In Proceedings of European Conference on Networks and Communications, Jun. 27, 2016, 5 Pages.

"International Search Report and Written Opinion Issued in PCT Application No. PCT/US23/016671", dated Jun. 29, 2023, 16 Pages.

\* cited by examiner

| Vendor-1 | Storage | CPU | Supported users | Price |
|---|---|---|---|---|
| Radio | 50GB | 15 | 100 | $0.80/month/user |
| EMS | 200GB | 2 | 10 | $0.80/month/user |
| Firewall | 1TB | 5 | 500 | $0.80/month/user |

810

| Vendor-2 | Storage | CPU | Supported users | Price |
|---|---|---|---|---|
| Radio | 60GB | 20 | 200 | $0.85/month/user |
| EMS | 150GB | 4 | 40 | $0.50/month/user |
| Firewall | 1TB | 5 | 500 | $0.80/month/user |

NETWORK FUNCTIONS DELIVERY SYSTEM FOR MOBILE NETWORKS

BACKGROUND

Network functions that have traditionally been performed by dedicated hardware devices (e.g., firewalls, gateways, routers, switches, load balancers, etc.) are being performed in today's mobile networks, such as fifth generation (5G) networks, with general-purpose computers running in cloud-computing data centers using virtualization technology. The term "virtualized network function" (VNF) refers to a software-based implementation of a network function. Individual VNFs can be chained or combined together and used in sequence to perform one or more networking-related functions.

SUMMARY

A network functions delivery system provides customers representing mobile network and enterprise operators with an online repository for VNFs that are available from multiple VNF vendors and operable across infrastructure underlying the customer's mobile network including diverse private, public, and hybrid cloud platforms. The network functions delivery system provides a user interface (UI) exposing a catalog of VNFs offering differentiated performance across a range of categories of access network functions and core network functions from which the customer can compare VNF features and capabilities, associated technical requirements, and applicable commercial terms. When the customer selects a VNF, the network functions delivery system delivers a VNF package with associated supporting lifecycle scripts, executables, and other artifacts, as needed, and deploys the VNF on the customer's mobile network. Upon successful deployment of the VNF, the network functions delivery system interacts with a commercial system to create a suitable billing record for the customer. If deployment problems arise, the network functions delivery system can troubleshoot the VNF installation and notify the customer of issues through the UI and provide recommendations and solutions.

In various illustrative embodiments, the network functions delivery system may provide templates to different VNF vendors to package VNFs in a consistent and standardized format for onboarding to the online repository. The template implements a VNF deployment data model describing network resource requirements, networking, day zero configuration, and other function/service operational behaviors such as monitoring key VNF performance indicators, placement policies for service chaining, lifecycle stages, scaling rules, and the like.

The network functions delivery system may include a cloud verifier entity that interoperates with the customer's cloud-computing infrastructure to monitor network configuration and operating state including availability of compute, memory, storage, and networking resources. The cloud verifier entity may work within a specially curated deployment environment in the customer's mobile network, such as a dedicated network slice, to streamline VNF installation for the customer, improve deployment success rates, and reduce the time needed to roll-out services, upgrades and improvements, patches, and new features.

The cloud verifier entity can leverage its increased scope of control and access to the curated deployment environment—including, for example, knowledge of applicable customer rules and policies, access to network resource managers, and possession of required rights and permissions—to simplify deployment for the customer by automating VNF onboarding to appropriate NFV (Network Functions Virtualization) Management and Orchestration (MANO) and facilitating connections to VNF monitoring systems in the mobile network. Resources can be pre-provisioned in a network slice implementing the curated deployment environment to speed VNF deployment for new mobile network services while reducing deployment issues.

Additional automation can also be remotely performed by the network functions delivery system in the curated environment when a VNF deployment may require network changes such as configuration of security groups, changing firewall rules, installing and configuring load balancers, IP (Internet Protocol) address management, and the like. The curated deployment environment can be scaled and/or replicated across regular commercial and production environments in the customer's mobile network as desired.

The present network functions delivery system provides numerous technical advantages to mobile network customers and VNF vendors. For vendors, producing VNFs for inclusion in the master catalog leverages economies of scale to increase the customer base for their products across a range of diverse cloud-computing infrastructure. This incentivizes vendors to build out rich feature sets as vendor lock-in is minimized by the open market paradigm that is supported by the master catalog. For customers, the network functions delivery system provides deep automation for VNF installation and configuration which speeds deployment of network features and upgrades with improved network reliability compared to conventional manual deployment methods. The VNFs in the master cloud are cloud platform-agnostic and can be applied to multi-tenancy environments without any reduction in security or workload isolation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 8 shows illustrative VNFs in different network function categories that are available from different vendors;

Like reference numerals indicate like elements in the drawings. Elements are not drawn to scale unless otherwise indicated.

DETAILED DESCRIPTION

Figure 1:
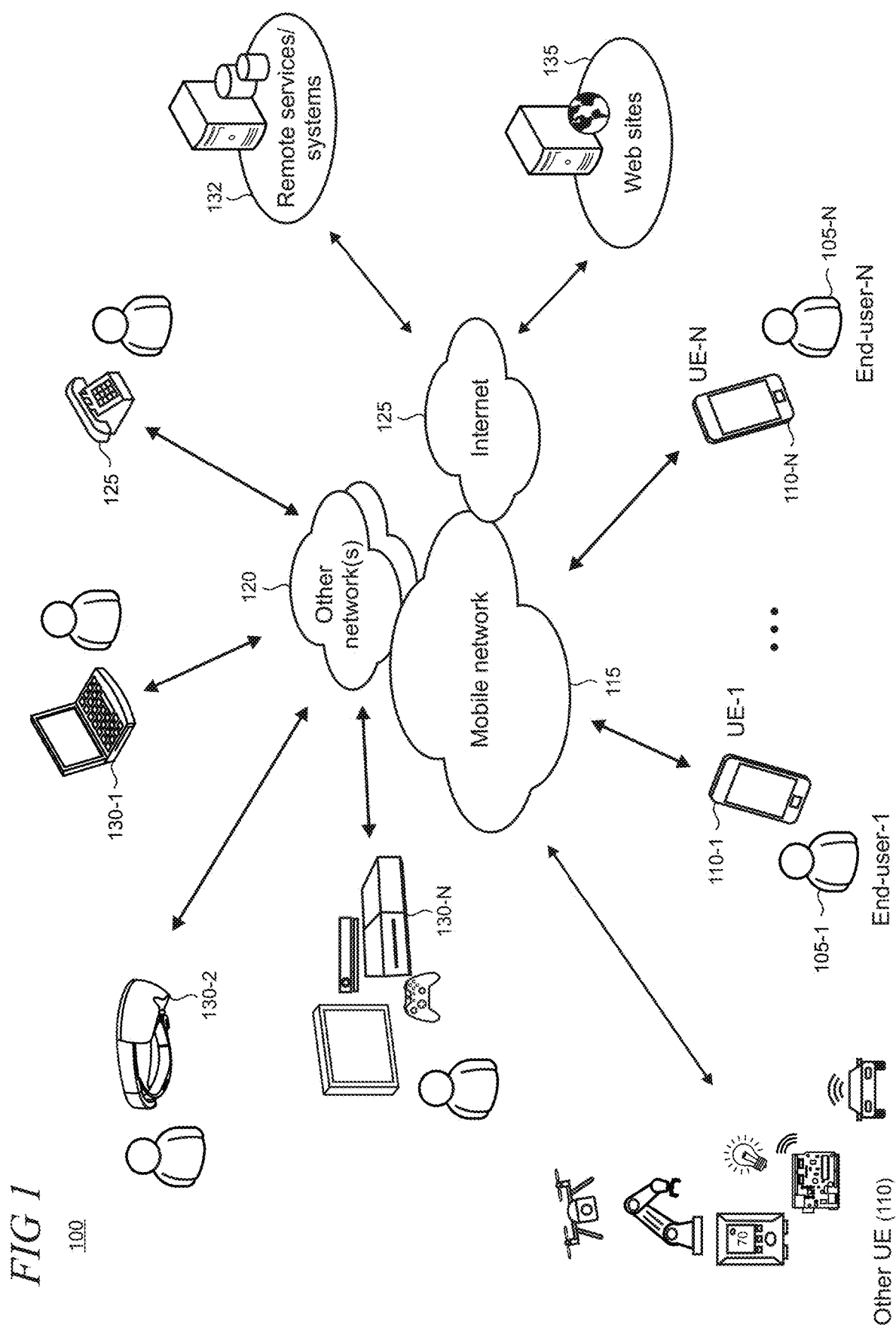
FIG. 1 shows an illustrative mobile telecommunications environment in which computing devices and associated users communicate over a mobile network with other devices and services.

FIG. 1 shows an illustrative telecommunications environment 100 in which the same or different end-users 105 may employ various computing devices, generally referred to as "user equipment" (UE) 110, that can communicate with other computing devices and various services over a mobile network 115. In some cases, other networks (representatively indicated by reference numeral 120) can also be supported in the telecommunications environment. The networks 115 and 120 can include different network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. As used in the description of the present principles herein, an operator of a mobile network may comprise one of various parties, entities, or organizations that provide or support services to end-users of mobile computing devices using infrastructure that includes radio access networks. Operators may include for example, but not be limited to mobile network service providers, mobile network operators (MNOs), operators of enterprises, telecommunications service providers, carrier service providers, Internet service providers (ISPs), telephone service providers, data service providers, and the like. As used herein, operators may also include parties, entities, or organizations that own or control access to a radio spectrum license from a regulatory or government entity. Operators of mobile networks may also be virtual MNOs by purchasing or otherwise obtaining rights to utilize licensed spectrum from other parties, entities, or organizations.

Some of the end-users 105 and UE 110 may have an association such as subscription, contract, plan, or the like with one of the networks 115 and 120 (or otherwise be authorized to access and use the network), while other end-users and computing devices can have an association with another one of the networks. The depiction of two networks in this example is illustrative, as the number of networks utilized in the telecommunications environment 100 can vary by implementation.

The UE 110 shown in FIG. 1 may be representative of the wide variety of device types that may utilize mobile networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. Other types of telephony equipment may also be present in the telecommunications environment 100 such as conventional desktop phones 125 which are operatively coupled to a public switched telephone network ("PSTN"). Other examples may include equipment that connects to the PSTN using private branch exchanges ("PBXs") and equipment coupled to call services that are accessed using telephone numbers. Other types of computing devices 130, such as personal computers (PCs), laptop computers, multimedia consoles, and the like may be configured and equipped to support telephony applications in some cases.

The mobile network 115 may include interfaces supporting connections to public networks such as the Internet 125 so that UE 110 can access content and render end-user experiences provided by various remote or cloud-based application services 132 and websites 135. The application services and websites can support a diversity of features, services, and end-user experiences such as social networking, mapping, news and information, entertainment, travel, productivity, finance, electronic commerce (e-commerce), etc. The application services and websites are collectively referred to as application services in the description that follows.

Figure 2:
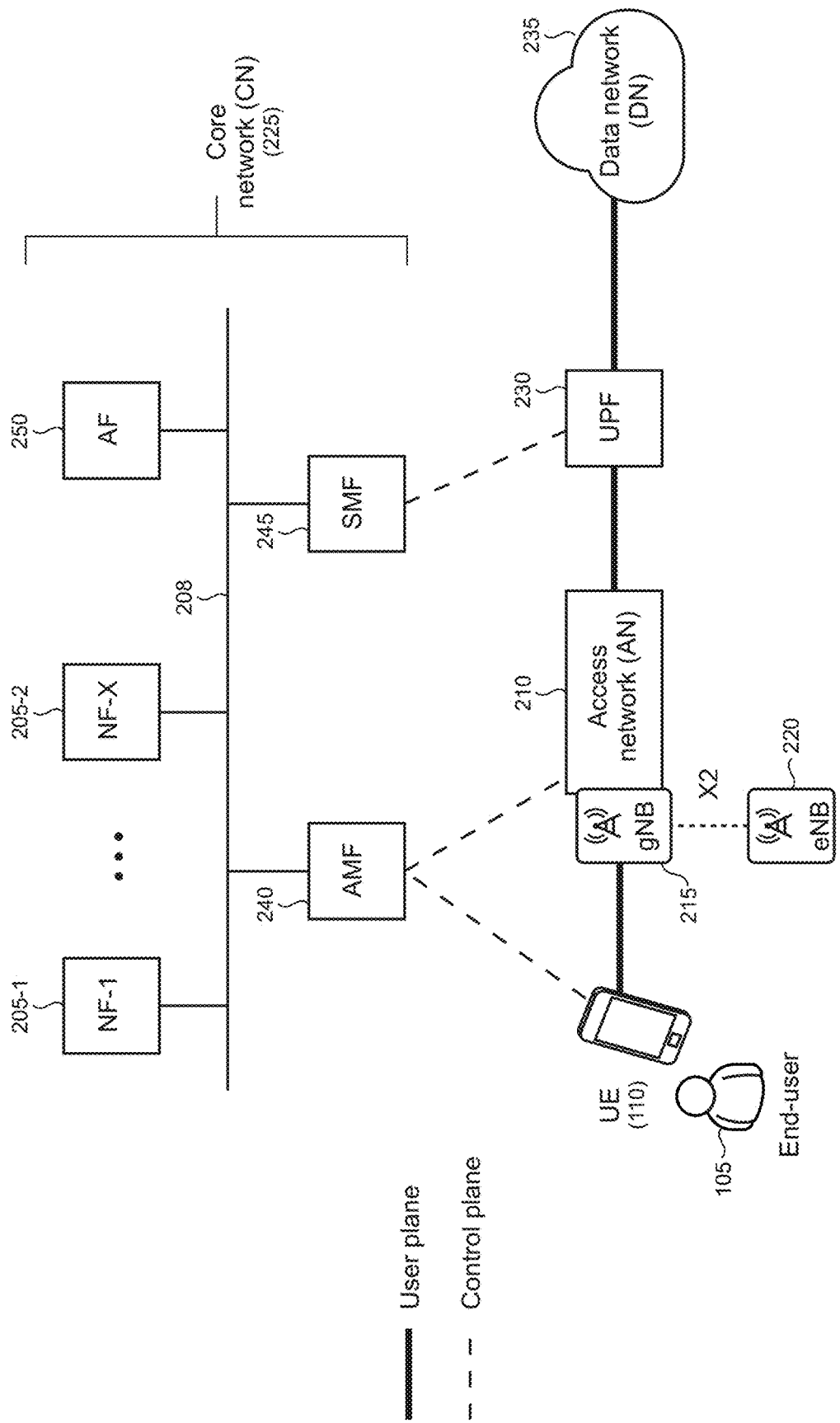
FIG. 2 shows an illustrative mobile network that uses a service-based architecture.

FIG. 2 shows an illustrative mobile network 115 that uses a service-based architecture (SBA) as defined by the 3GPP (3rd Generation Partnership Project). SBAs provide a modular framework from which common applications can be deployed using components of varying sources and vendors. In SBAs, control plane functionality and common data repositories of a 5G network are delivered by way of a set of Network Functions (NFs) 205 that are interconnected with a service-based interface bus 208, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

In this illustrative example, the mobile network comprises 5th-generation (5G) mobile network infrastructure in a standalone (SA) architecture. However, it may be appreciated that the present principles may be adapted in some cases to non-standalone (NSA) architectures in which the 5G access network (AN) 210 is used in conjunction with existing 4th-generation (4G) LTE (Long Term Evolution) and EPC (Evolved Packet Core) infrastructure. In this scenario, in addition to a 5G gNB 215 operating a radio base station, a 4G eNB 220 is connected to the 5G AN via an X2 interface to provide NSA capabilities. In SA in which 5G is fully deployed, NFs may be utilized in both the 5G core network (CN) 225 and the AN, while in NSA, only 4G services are supported in the 4G EPC, so NF deployment is limited to the 5G AN in such cases.

As shown in FIG. 2, a User Plane Function (UPF) 230 handles user data performing operations such as maintaining PDU (Protocol Data Unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 235.

An Access and Mobility Management Function (AMF) 240 receives all connection and session related information from the UE 110 but is responsible only for handling connection and mobility management tasks such as registration and authentication, identification, and mobility. All messages related to session management are forwarded over an interface to the Session Management Function (SMF) 245 that establishes and manages sessions. It also selects and controls the UPF 230 and handles paging. The Application Function (AF) 250 provides service or application related information to the NF service consumer. For example, the AF may perform operations such as retrieving resources and exposing services to end-users 105.

Figure 3:
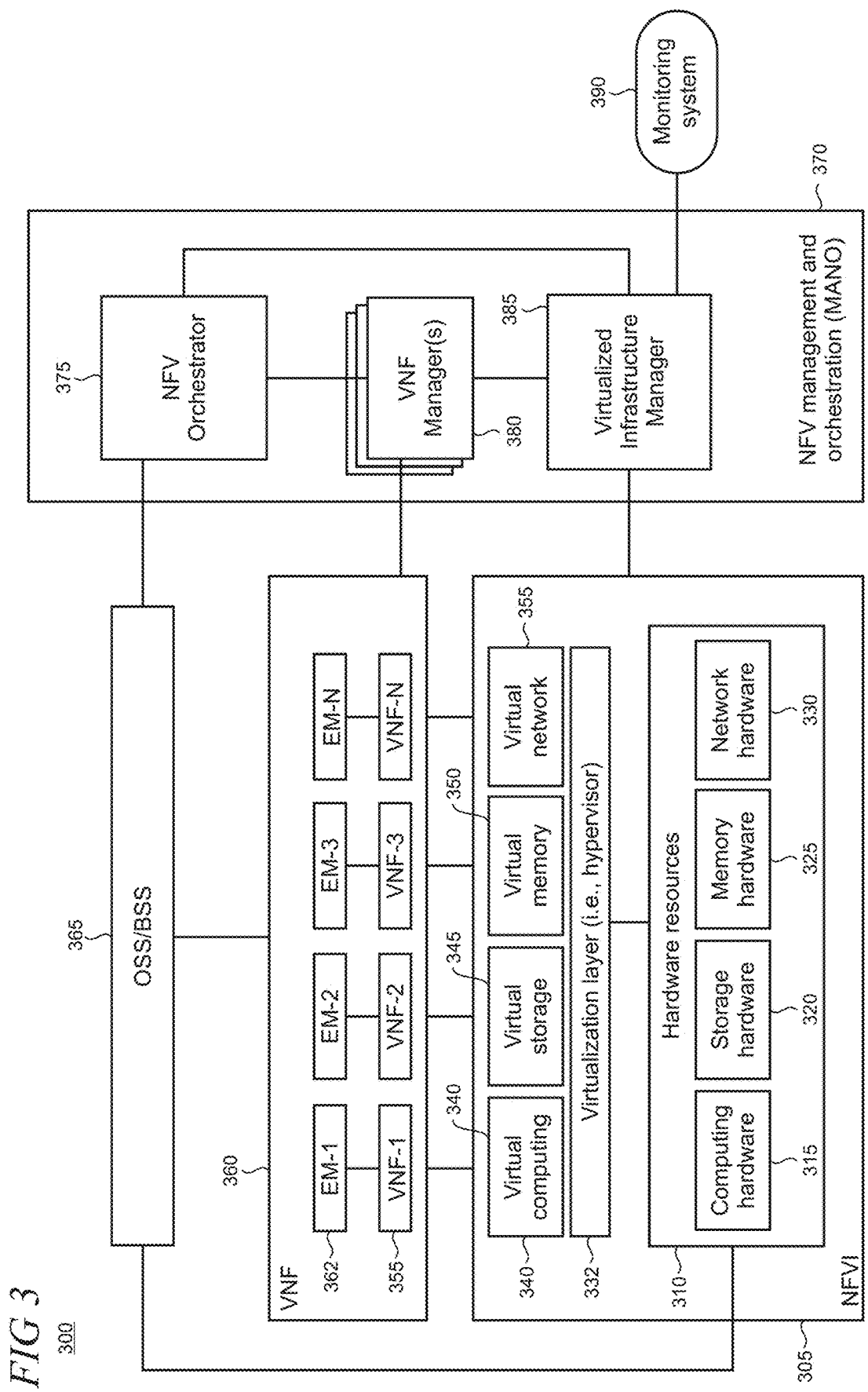
FIG. 3 shows an illustrative network functions virtualization (NFV) architectural framework.

FIG. 3 shows an illustrative network functions virtualization (NFV) architectural framework 300 that is described by the European Telecommunications Standards Institute (ETSI). The framework includes NFV infrastructure (NFVI) 305 that is an abstraction of physical hardware resources 310 including compute (i.e., computing servers) 315, storage 320, memory 325, and networking 330 as well as the hypervisor code that implements a virtualization layer 332 to thereby support respective virtualized counterparts, as respectively indicated by reference numerals 340, 345, 350, and 355.

A VNF (representatively indicated by reference numeral 355) in a VNF layer 360 of the framework 300 is a virtualization of an NF in a legacy non-virtualized mobile network. However, the functional behavior and state of an NF are largely independent of whether the NF is virtualized or not. The functional behavior and the external operational interfaces of a physically embodied NF and a VNF are expected to be the same. Element Management (EM) 362 performs typical management functionality for one or more VNFs, for example, managing faults, configurations, accounting, performance, security, and the like.

At the top of the framework 300 are operation support systems (OSS) and business support systems (BSS) that comprise the mobile network operator's back-end systems that manage, for example, networks, services, end-user customers, products, and orders. The OSS/BSS 365 communicates with an NFV MANO 370 which provides the framework for management and orchestration of all the resources in an NFV environment including, for example, deploying and operating the VNF to provide network services on the virtualized resources, and managing the lifecycle of VNF and NS instances to fulfill the business benefits for service providers. The NFV MANO interacts with EM 362 to manage the logical function and assure service levels of the VNFs in the VNF layer 360 spanning across the management of VNF fault, configuration, accounting, performance, and security.

The NFV MANO includes an NFV Orchestrator 375 that typically orchestrates one or more VNFs into network services and manages the lifecycle of those network services. The NFV Orchestrator interoperates with a VNF manager 380 that manages the lifecycle of VNF instances including, for example, instantiating, updating, upgrading, scaling, healing and/or terminating a VNF. Each VNF instance is associated with a VNF manager.

A Virtualized Infrastructure Manager 385 manages the resources of the NFVI 305 and exposes the NFVI capabilities to upstream systems in the framework including the VNF Managers 380 and NFV Orchestrator 375. The Virtualized Infrastructure Manager collects performance and fault information for hardware, software, and virtualized resources and forwards performance measurement results and faults/events information relative to virtualized resources to the other systems. Accordingly, a monitoring system 390 can be implemented using an appropriate interface to the Virtualized Infrastructure Manager to monitor deployment, events, and performance associated with a given VNF. The VNF monitoring system can be implemented as a standalone system or alternatively be instantiated in the NFV MANO 370 with appropriate modification.

In some implementations, VNF-specific monitoring rules can be assigned to the monitoring system 390 at the time of VNF provisioning. For example, the monitoring rules may include a list of VNF components associated with the VNF along with a list of corresponding performance parameters that have to be monitored for each VNF component. As discussed further below, the monitoring rules may be included as part of a VNF package provided by a VNF vendor in some cases.

Figure 4:
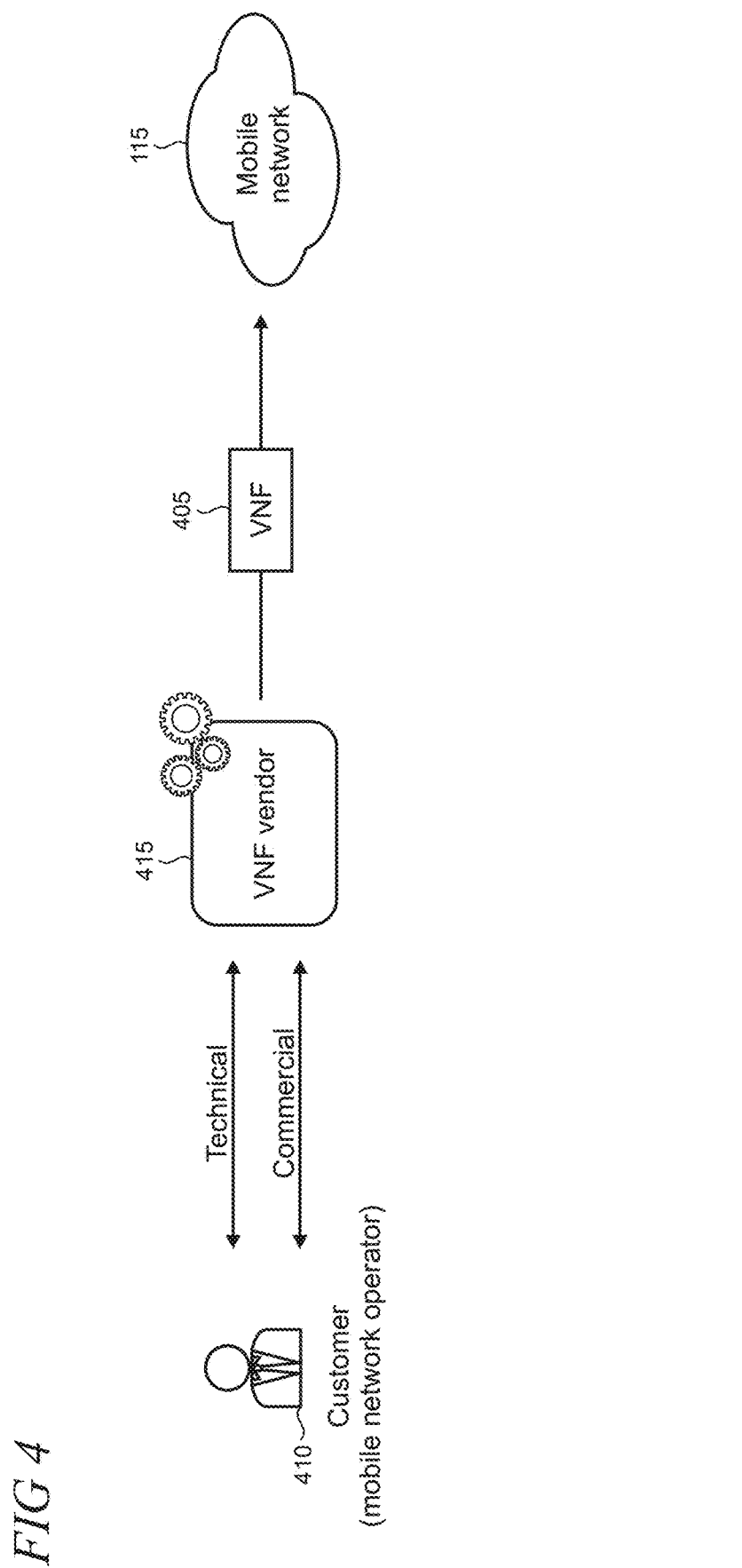
FIG. 4 shows illustrative conventional interactions between a mobile network operator customer and a virtual network function (VNF) vendor.

Conventionally, a VNF 405 is procured for deployment in an operator's mobile network 115 using a complex process involving a large number of technical and commercial steps as illustratively shown in FIG. 4. A customer 410 (i.e., one or more persons representing the mobile network operator) engages in discussions and negotiations with a VNF vendor 415 regarding technical aspects of a given network service that may be implemented using a VNF. Such technical aspects may include, for example, planning, service design (e.g., features, operational requirements, interoperability with internal and external systems, VNF chaining, etc.), deployment (e.g., when, where, and how deployed, by whom, etc.), operational considerations (e.g., lifecycle of services and resources, environment preparation, etc.), and the like. Commercial aspects may include, for example, licensing, billing, warranty, and other business terms.

Conventional VNF procurement processes can be time-consuming for customers because the development of NFV solutions may need to be performed serially with different VNF vendors. Technical and commercial terms may also be vendor-specific, at least in part, as VNFs offerings are not standardized, and therefore not directly comparable on equivalent bases. As a result, mobile network operators typically face significant obstacles when attempting to provide new service offerings, maintain or upgrade existing services, and maximize operating efficiency as their networks evolve to meet challenges in the competitive mobile telecommunications industry.

Figure 5:
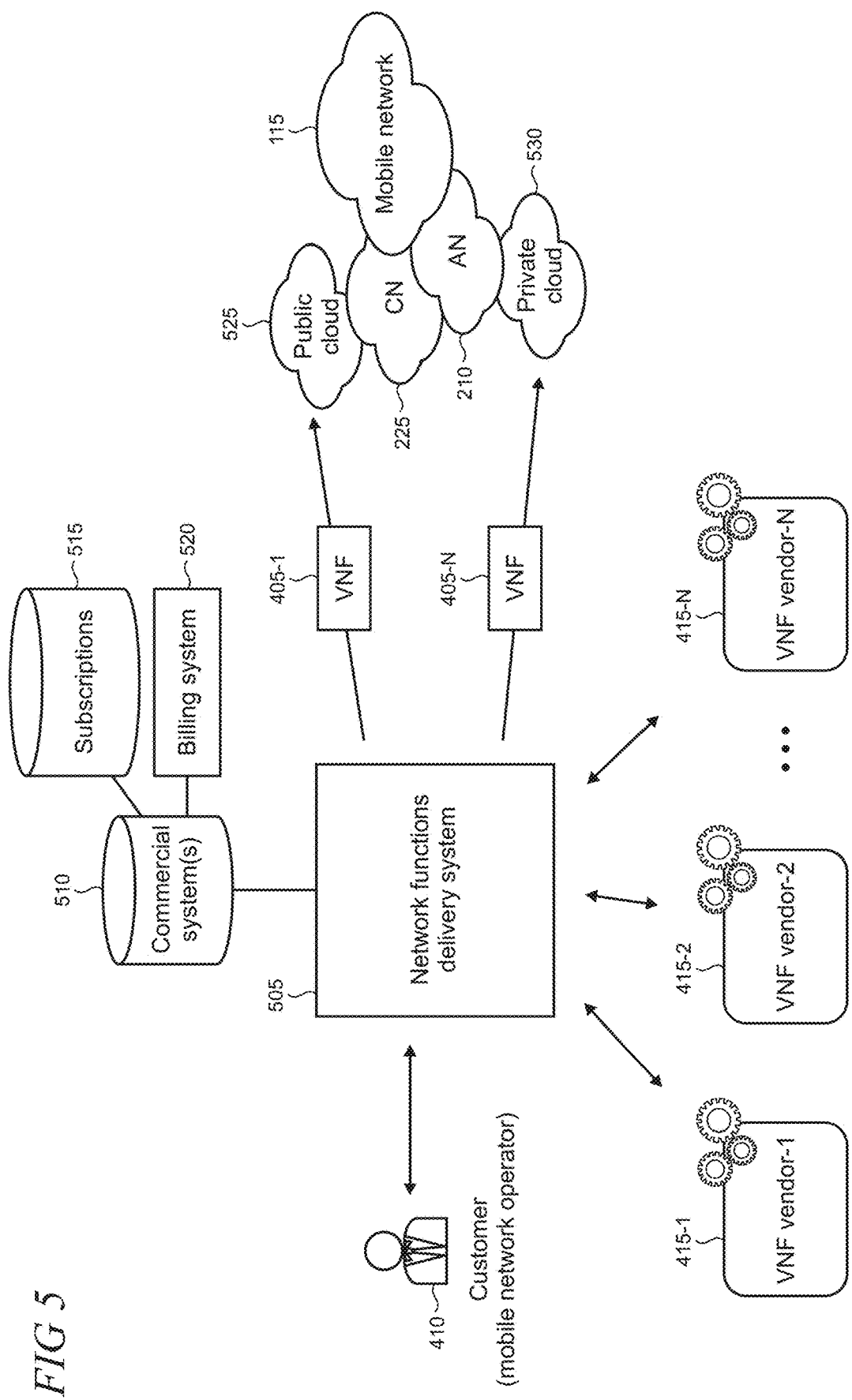
FIG. 5 shows illustrative interactions among a mobile network operator customer, VNF vendors, and a network functions delivery system arranged in accordance with the present principles.

FIG. 5 shows illustrative interactions among a mobile network operator customer 410, different VNF vendors 415, and a network functions delivery system 505 arranged in accordance with the present principles for VNF procurement that provides technical advantages compared to the conventional processes discussed above. The network functions delivery system interoperates with one or more commercial systems 510 that may include, for example, a subscription database 515 and a billing system 520.

The network functions delivery system 505 is configured to enable the customer 410 to select a VNF 405 from a repository of VNFs from the different vendors 415 which can then be deployed to various locations including public (e.g., hyperscale) and/or private clouds 525 and 530 providing infrastructure for either or both the CN 225 and AN 210 of the mobile network 115.

Figure 6:
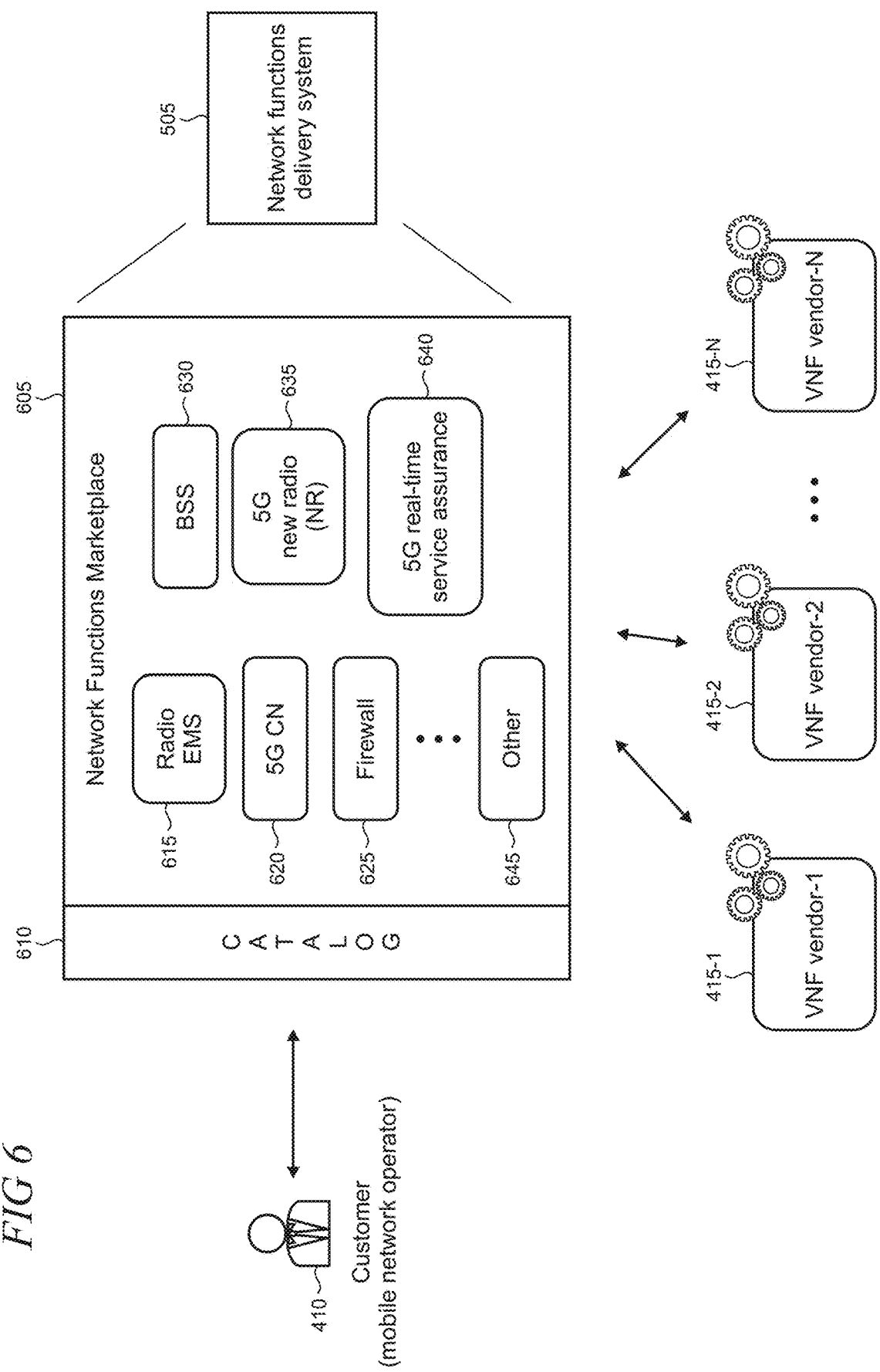
FIG. 6 shows an illustrative VNF marketplace that is supported by the present network functions delivery system.

FIG. 6 shows an illustrative network functions marketplace 605 that is exposed by the network functions delivery system 505. The network functions marketplace represents a single repository of VNFs that are available across different network functions categories from different vendors. The marketplace may provide a catalog 610 as a UI for the customer 410. The network functions market may include VNFs supplied by different vendors 415 in various network function categories. Illustratively, the categories include radio EMS (Element Management System) 615, 5G CN 620, firewall 625, BSS (Business Support Systems) 630, 5G new radio (NR) 635, and 5G real-time service assurance 640. It is emphasized that the categories shown and described herein are exemplary and that various other categories 645 of network functions can be supported in the marketplace to meet requirements of a particular implementation.

Figure 7:
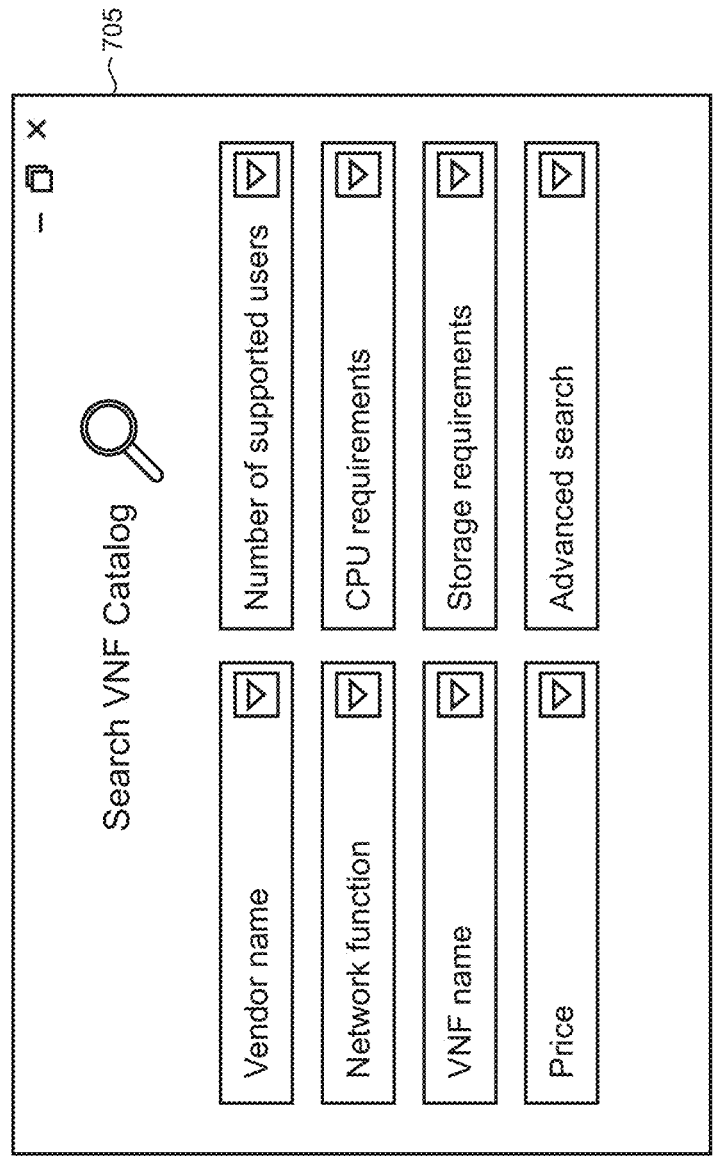
FIG. 7 shows an illustrative user interface (UI) to perform a search of a catalog of VNFs available from different VNF vendors.

The layout and design of the catalog 610 can vary by implementation. Typically, the catalog is organized to enable customers to browse for VNFs and obtain relevant information about network features, deployment requirements, costs, and the like. Suitable control elements may be supported in a UI to enable the customer to interact with the catalog of VNFs available in the marketplace. In one example, FIG. 7 shows an illustrative UI 705 configured to enable a customer to perform a search of the catalog of VNFs available from different VNF vendors by selecting filtering criteria that are applied to the cataloged VNFs.

The catalog 610 advantageously enables customers to compare and contrast VNF offerings from different vendors on an equivalent basis. VNF vendor-supplied information may be exposed to customers in the VNF catalog. For example, FIG. 8 shows radio, EMS, and firewall VNF offerings in tables 805 and 810 from two different vendors that are filtered based on storage, compute (i.e., CPU) requirements, a maximum number of supported users, and price. It may be appreciated that VNF information may exposed in the catalog using filtering criteria that are different from what is shown in this particular example.

Figure 9:
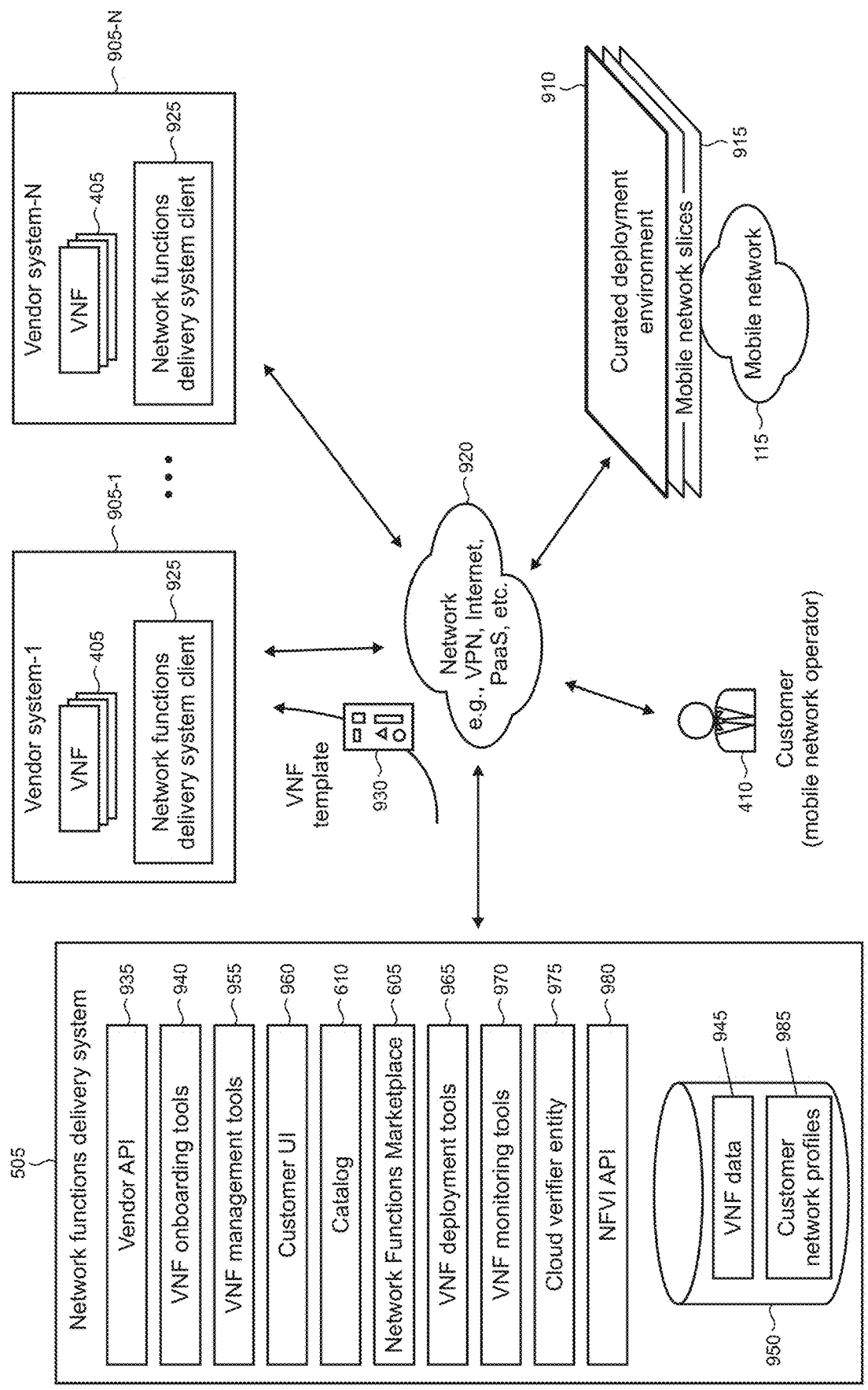
FIG. 9 shows illustrative components of the present network functions delivery system that interact with vendor systems and a curated deployment environment that may be implemented using a slice of a mobile network.

FIG. 9 shows illustrative components of the present network functions delivery system 505 that interact with vendor systems 905 and a curated deployment environment 910 that may be implemented using one or more slices 915 of a mobile network 115 (slicing of 5G mobile networks is described in more detail in the text accompanying FIG. 17 below). The customer 410, network functions delivery system, and vendor system can interact over a communications network 920 such as a virtual private network (VPN), the Internet or other public networks, Platform as a Service (PaaS) network, or other suitable network.

An instance of a network functions delivery system client 925 may be utilized in the vendor systems 905 to facilitate onboarding and management of the VNFs 405 to the network functions delivery system 505. VNF vendors can provide relevant information about their VNFs 405 and packaged according to a standardized template 930 that is exposed by the client or otherwise supplied by the network functions delivery system. Utilization of the template may help to ensure that sufficient objective information is provided about the vendor's offerings for customers to make informed decisions about VNF selection and deployment. For example, the template may implement a VNF deployment data model describing network resource requirements, networking, day zero configuration, and other function/service operational behaviors such as monitoring key VNF performance indicators, placement policies for service chaining, lifecycle stages, scaling rules, and the like.

As shown, components of the network functions delivery system 505 include an application programming interface (API) 935 to enable interactions with the vendor systems 905. Various tools can be exposed to the vendors including VNF onboarding tools 940 that may provide functionalities for onboarding VNF package data 945 to the online repository 950 and supplying relevant VNF information for inclusion in the catalog. VNF management tools 955 may provide functionalities for ongoing management of VNFs once onboarded to the system such as VNF lifecycle, updates, fixes, versioning support, and the like.

A customer UI 960 provides access by the customer 410 to the network functions delivery system 505 through which the network functions marketplace 605 is exposed including the catalog 610. Various tools can be exposed to the customers including VNF deployment tools 965 that facilitate the deployment of VNFs to the customer's mobile network, and in particular, the curated deployment environment 910. VNF monitoring tools 970 may be provided to enable the customer to monitor deployment, events, and performance associated with a given VNF. The monitoring tools can be implemented as a part of a standalone system in some scenarios, or be configured for interoperation with existing customer monitoring systems in others.

A cloud verifier entity 975 may also be implemented as a component of the network functions delivery system 505. As described in more detail below, the cloud verifier entity is configured to operate as an intermediary between the network functions marketplace 605 and the curated deployment environment 910 in the customer's mobile network 115 to facilitate VNF deployment and operations. The cloud verifier entity may operate through an API 980 to the NFVI 305 (FIG. 3) underlying the mobile network. Network profiles 985 and other data pertaining to a given customer may be stored locally (e.g., in the online repository 950 or other local database) and utilized by the cloud verifier entity.

Figure 10:
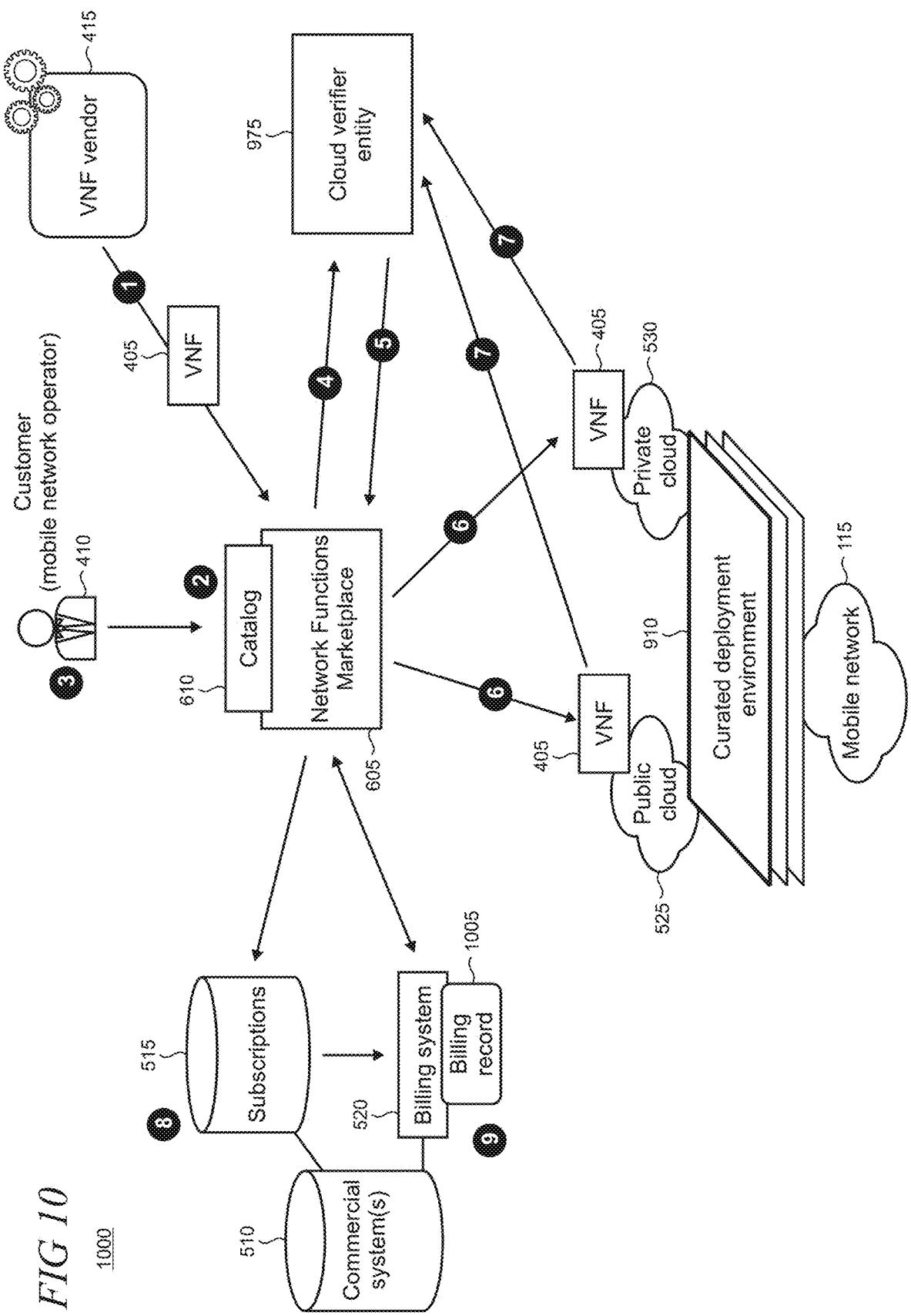
FIG. 10 shows an illustrative workflow for deploying a VNF in a mobile network in accordance with the present principles.

FIG. 10 shows an illustrative workflow 1000 for deploying a VNF 405 in the curated deployment environment 910 of the mobile network 115 in accordance with the present principles. At step 1, a VNF vendor 415 uploads a VNF 405 that is suitably packaged (e.g., in accordance with the template 930 (FIG. 9)) to the network functions marketplace 605 supported by the network functions delivery system. At step 2, the VNF package is added to the catalog 610 (VNF packaging is discussed in more detail in the text accompanying FIG. 11 below). At step 3, the customer 410 selects a VNF from the catalog.

At step 4, in response to the customer's selection of a VNF 405, the marketplace 605 makes a query to the cloud verifier entity 975 to ascertain whether the curated deployment environment 910 in the mobile network 115 has currently available resources (e.g., computer, memory, storage, network, etc., as applicable) to support deployment of the selected VNF. At step 5, the cloud verifier entity provides verification to the marketplace as the sufficiency of the resources. At step 6, the marketplace can push the VNF 405 to appropriate locations, whether in the public cloud 525 and/or private cloud 530 portions of the mobile network infrastructure.

At step 7, the VNF 405 can report successful deployment status to the cloud verifier entity 975. The cloud verifier entity can interact with the commercial system 510 to update the customer's subscription 515 at step 8 and create a suitable billing record 1005 in the billing system 520 at step 9. For example, the marketplace 605 and vendor 415 may split the billed revenue from the customer 410 per some prearranged commercial agreement.

Figure 11:
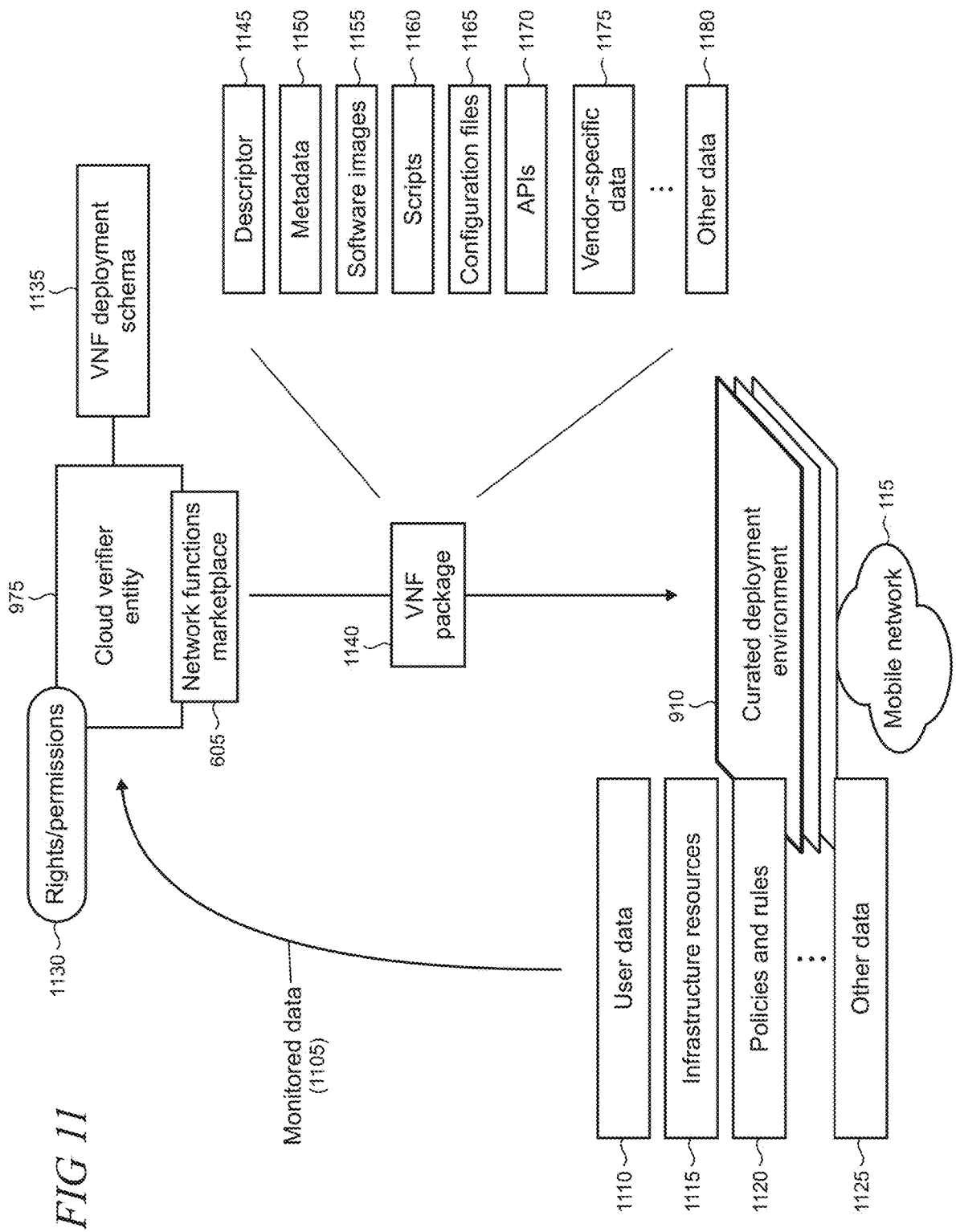
FIG. 11 shows illustrative interactions between a cloud verifier entity and marketplace and a curated deployment environment in a mobile network.

FIG. 11 shows illustrative interactions between the cloud verifier entity 975 and marketplace 605 and the curated deployment environment 910 in the mobile network 115. The cloud verifier entity leverages knowledge obtained from the curated deployment environment, for example through the NFVI API 980 (FIG. 9), to provide verification to the marketplace, as appropriate, that resources are in place in the curated deployment environment to support deployment of a customer-selected VNF. A curated environment in the customer's mobile network is one having well defined boundaries and properties to enable fine-grained introspection of network state before, during, and after VNF deployment. Event monitoring and logging and exception handling functionalities are provided in the curated deployment environment to assist in the resource verification processes. In some scenarios, network resources may be pre-provisioned in the curated deployment environment, in accordance with a pre-arranged agreement between the mobile network operator and network functions delivery system 505 (FIG. 5), to streamline VNF instantiation.

The increased scope of access of the cloud verifier entity in the network functions delivery system to the curated deployment environment 910 compared to conventional VNF deployment methodologies enhances the speed and accuracy of identification of pertinent deployment and/or operational issues while confining such issues within the environment boundaries. While the curated deployment environment may be specially configured for troubleshooting VNF issues, it is typically configured to replicate regular properties of the customer's network to enable scaling across other portions or the entirety of the mobile network 115.

As illustratively shown in FIG. 11, the monitored data 1105 from the curated deployment environment 910 may include user data 1110 (which is typically anonymized) that describes user traffic loads and patterns, originating and terminating locations, and the like. Infrastructure resources 1115 may include, for example, compute, storage, memory, and network resources. Policies and rules 1120 may include customer policies regarding the behaviors of end-users, UE, hardware devices (e.g., firewalls, gateways, routers, switches, load balancers, etc.), and applications (including VNFs) in the mobile network 115. The policies and rules typically define how the mobile network should behave and how the connectivity services should be delivered based on a set of pre-defined conditions applicable to the end-users and the curated deployment environment. It is emphasized that examples of monitored data provided above are intended to be exemplary and that other data 1125 may be monitored to meet the needs of a particular implementation of the present principles.

Rights and permissions 1130 that may be needed to deploy a VNF in the curated deployment environment 910 can be provided to the cloud verifier entity 975 as needed to deploy a customer-selected VNF according to an agreed-upon VNF deployment schema 1135 that is tailored to the customer's curated deployment environment. In multi-tenant environments, each VNF deployment schema is separate and secure and VNF deployment workloads are isolated from each other.

A VNF package 1140 may be pushed from the network functions marketplace 605 to the curated deployment environment 910. The packaging may be implemented by a VNF vendor in accordance with a VNF template, as discussed above, and is configured to provide all the necessary information and executables needed for VNF selection from the catalog and deployment in the curated deployment environment. As illustratively shown, the VNF package includes various data referred to herein as "artifacts." The artifacts shown and described herein are illustrative and do not comprise an exhaustive listing. Not all the artifacts need to be utilized in every application of the present principles and some of the data types and categories in the artifacts may overlap.

Artifacts in the VNF package 1140 may include a VNF descriptor 1145 that defines various VNF properties including resource levels to be instantiated, key performance indicators, and other instantiation parameters that may be used for onboarding and managing the lifecycle of a VNF. Metadata 1150 may be optionally provided by the VNF vendor that may supplement the VNF descriptor in some cases. The VNF package may include software images 1155 needed to run the VNF in the curated deployment and scripts 1160 to manage a deployed VNF such as VNF lifecycle. Additional files may also be optionally included in a packaged VNF including various configuration files 1165 and/or executables such as APIs 1170. Vendor-specific data 1175 and/or other suitable data 1180 may also be included in a VNF package as may be required to meets the needs of a particular implementation.

Figure 12:
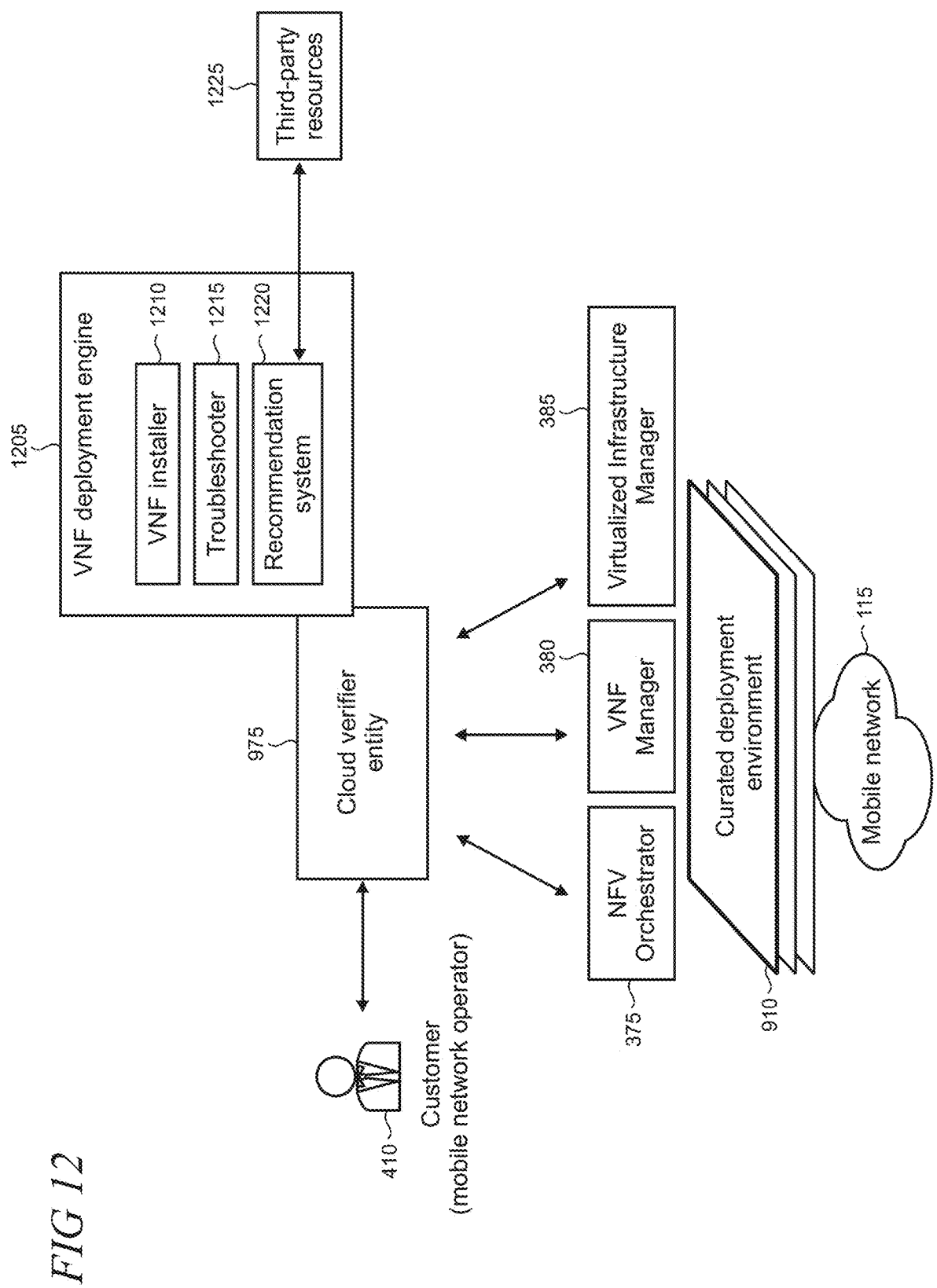
FIG. 12 shows illustrative details of a cloud verifier entity.

FIG. 12 shows illustrative components of the cloud verifier entity 975 including a VNF deployment engine 1205 that supports a VNF installer 1210, troubleshooter 1215, and recommendation system 1220. The deployment engine includes interfaces to external third-party resources 1225. During deployment of a customer-selected VNF, the cloud verifier entity interacts with the customer 410 and elements of the mobile network 115 including the NFV Orchestrator 375, VNF Manager 380, and Virtualized Infrastructure Manager 385 that support VNF instantiation in the curated deployment environment 975. More specifically, the VNF installer executes automated installation routines to enable the allocation of required mobile network resources and instantiation of the VNF in the deployment environment. For example, the VNF installer can perform changes to mobile networks such as configuration of security groups, changing firewall rules, installing and configuring load balancers, IP (Internet Protocol) address management, and the like. The VNF installer can also ensure that the installed VNF is accessible to various monitoring and Operations, Administration and Maintenance (OAM) systems in the mobile network.

Figure 13:
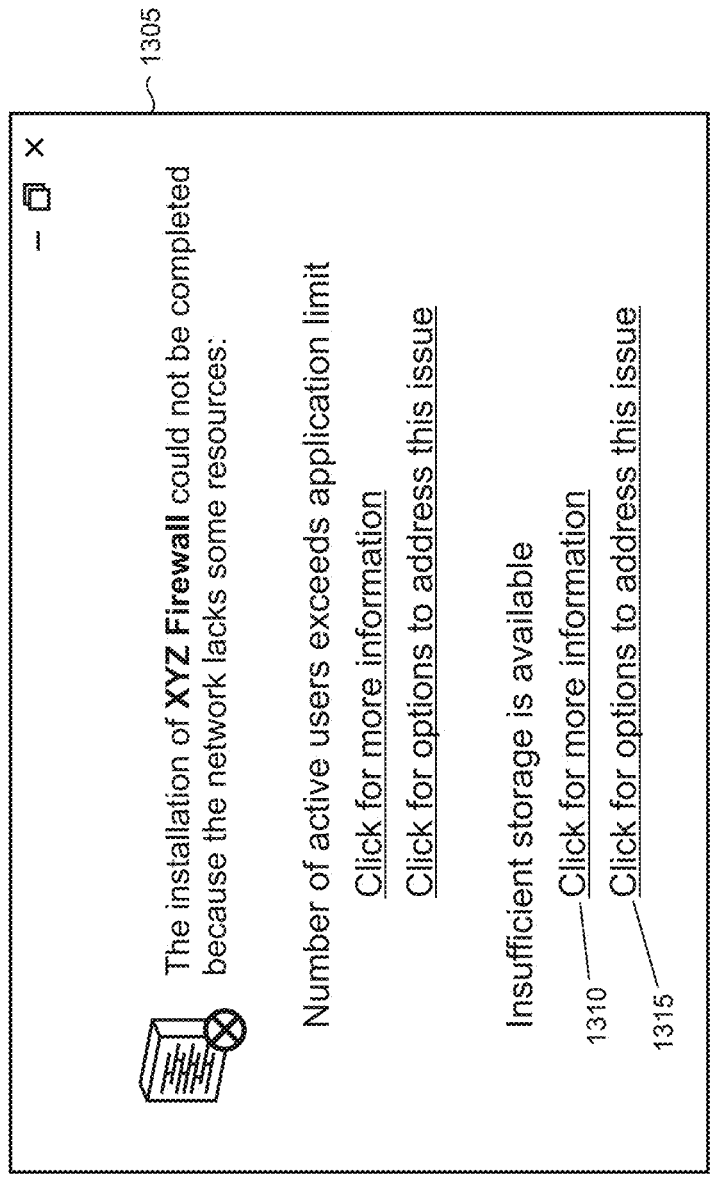
FIG. 13 shows an illustrative notification on a UI of a VNF deployment failure that includes links to obtain information and options to address the failure.

The troubleshooter 1215 monitors the VNF deployment, proactively identifies issues, performs root cause analysis of deployment errors, and provides alerts through the customer UI 960 (FIG. 9). The troubleshooter may be configured to interoperate with the recommendation system 1220 to provide suggestions to the customer 410 to resolve deployment issues. For example, insufficient resource availability may be a root cause for a VNF deployment failure. In this case, as shown in FIG. 13, the cloud verifier entity 975 can surface a notification 1305 through the customer UI that identifies one or more VNF installation errors. The recommendation system can populate links 1310 and 1315 in the notification that the customer can action to get more detailed information about the resource shortfall and learn of potential solutions. For example, link 1315 could direct the customer to additional storage resources that could be added to the curated deployment environment to support a selected VNF.

Figure 14:
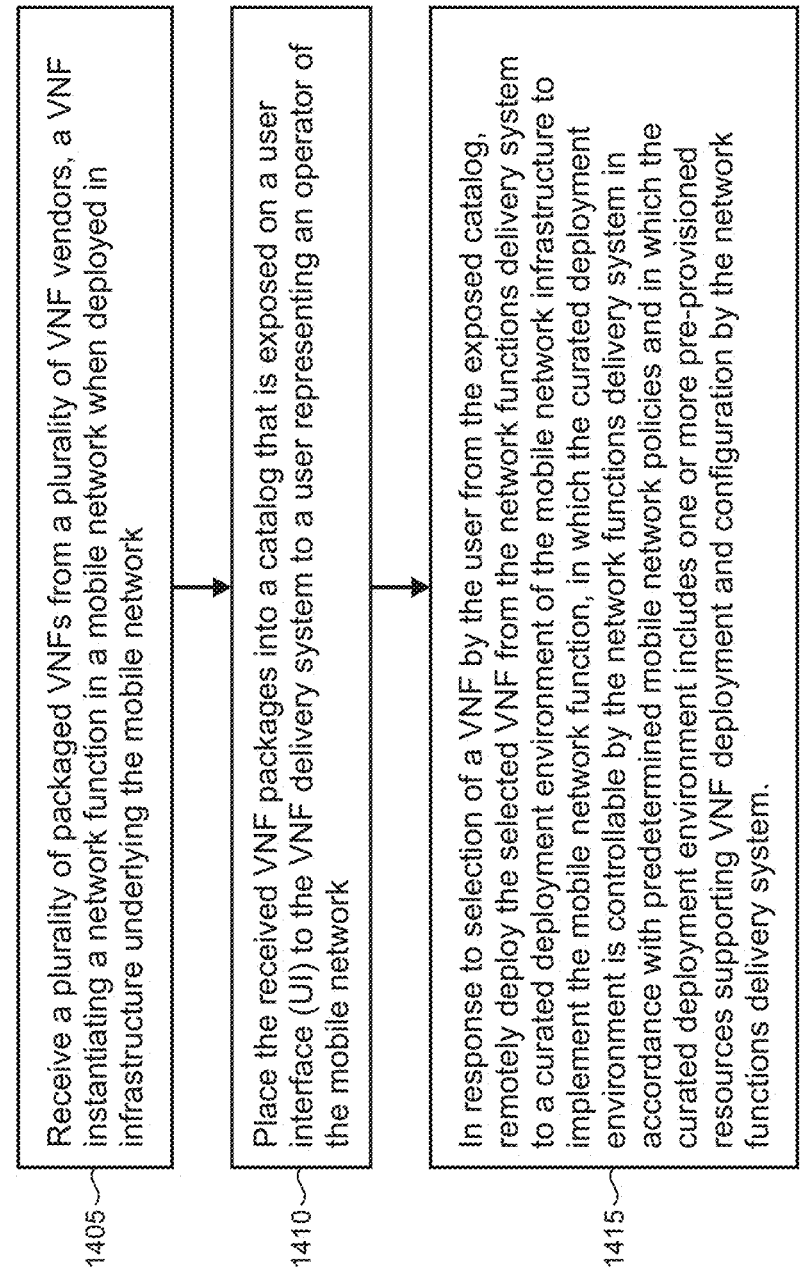
FIGS. 14, 15, and 16 show illustrative methods that may be performed when implementing the present network functions delivery system.

FIG. 14 is a flowchart of an illustrative method 1400 that may be performed by a computing device for distributing VNFs over a communications network from a network functions delivery system. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized. Block 1405 includes receiving a plurality of packaged VNFs from a plurality of VNF vendors in which a VNF instantiates a network function in a mobile network when deployed in infrastructure underlying the mobile network. Block 1410 includes placing the received VNF packages into a catalog that is exposed on a UI to the VNF delivery system to a user representing an operator of the mobile network.

Block 1415 includes, responsively to selection of a VNF by the user from the exposed catalog, remotely deploying the selected VNF from the network functions delivery system to a curated deployment environment of the mobile network infrastructure to implement the mobile network function in which the curated deployment environment is controllable by the network functions delivery system in accordance with predetermined mobile network policies and in which the curated deployment environment includes a collection of pre-provisioned resources supporting VNF deployment and configuration by the network functions delivery system.

Figure 15:
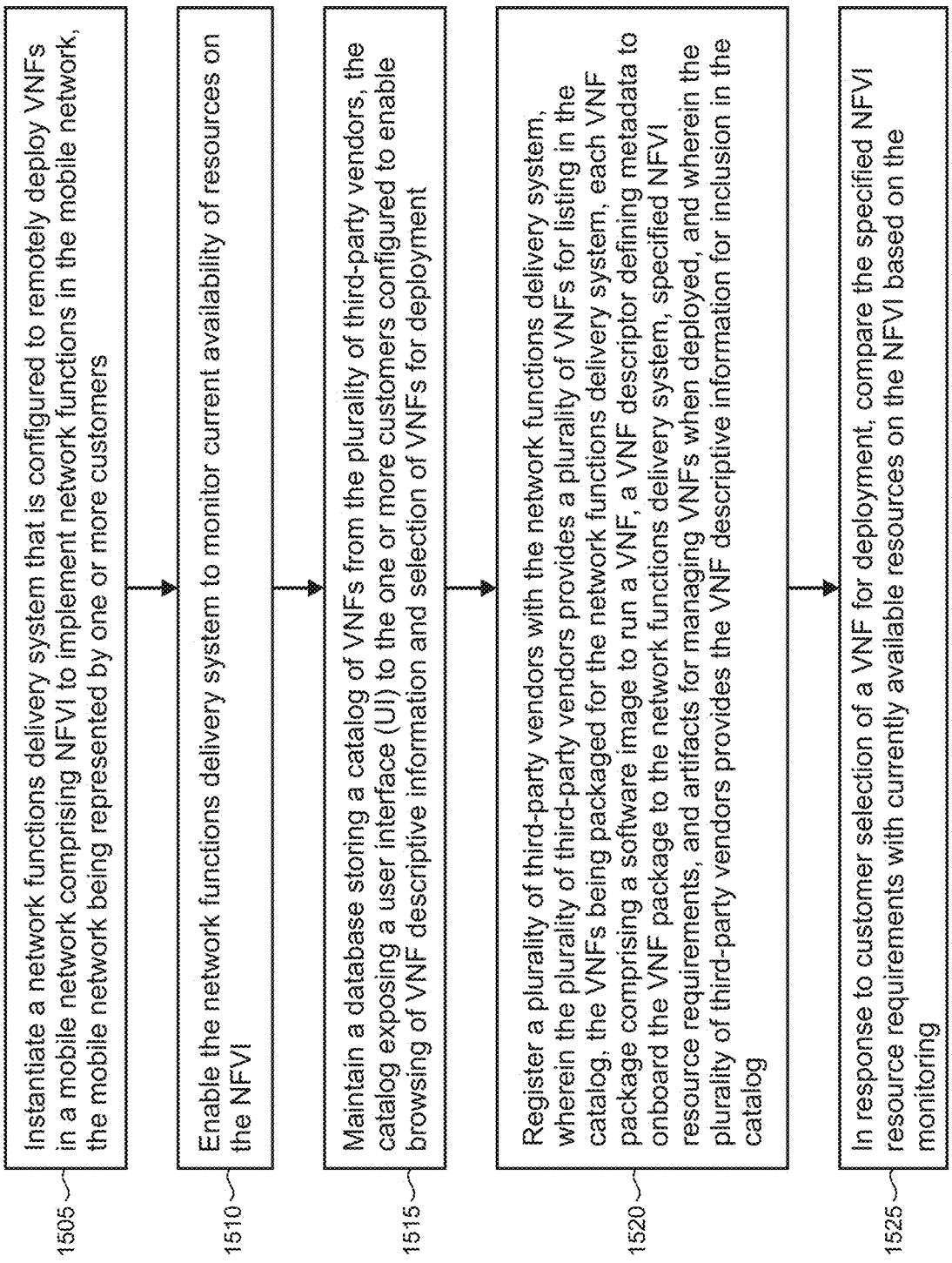

FIG. 15 is a flowchart of an illustrative method 1500 that may be performed by a computing device. Block 1505 includes instantiating a network functions delivery system that is configured to remotely deploy VNFs in a mobile network comprising NFVI to implement network functions in the mobile network, in which the mobile network is represented by one or more customers. Block 1510 includes enabling the network functions delivery system to monitor current availability of resources on the NFVI.

Block 1515 includes maintaining a database storing a catalog of VNFs from a plurality of third-party vendors, in which the catalog exposes a UI to the one or more customers configured to enable browsing of VNF descriptive information and selection of VNFs for deployment. Block 1520 includes registering the plurality of third-party vendors with the network functions delivery system, in which the plurality of third-party vendors provides a plurality of VNFs for listing in the catalog, and in which the VNFs are packaged for the network functions delivery system where each VNF package comprises a software image to run a VNF, a VNF descriptor defining metadata to onboard the VNF package to the network functions delivery system, specified NFVI resource requirements, and artifacts for managing VNFs when deployed, and wherein the plurality of third-party vendors provides the VNF descriptive information for inclusion in the catalog. Block 1525 includes, in response to customer selection of a VNF for deployment, comparing the specified NFVI resource requirements with currently available resources on the NFVI based on the monitoring.

Figure 16:
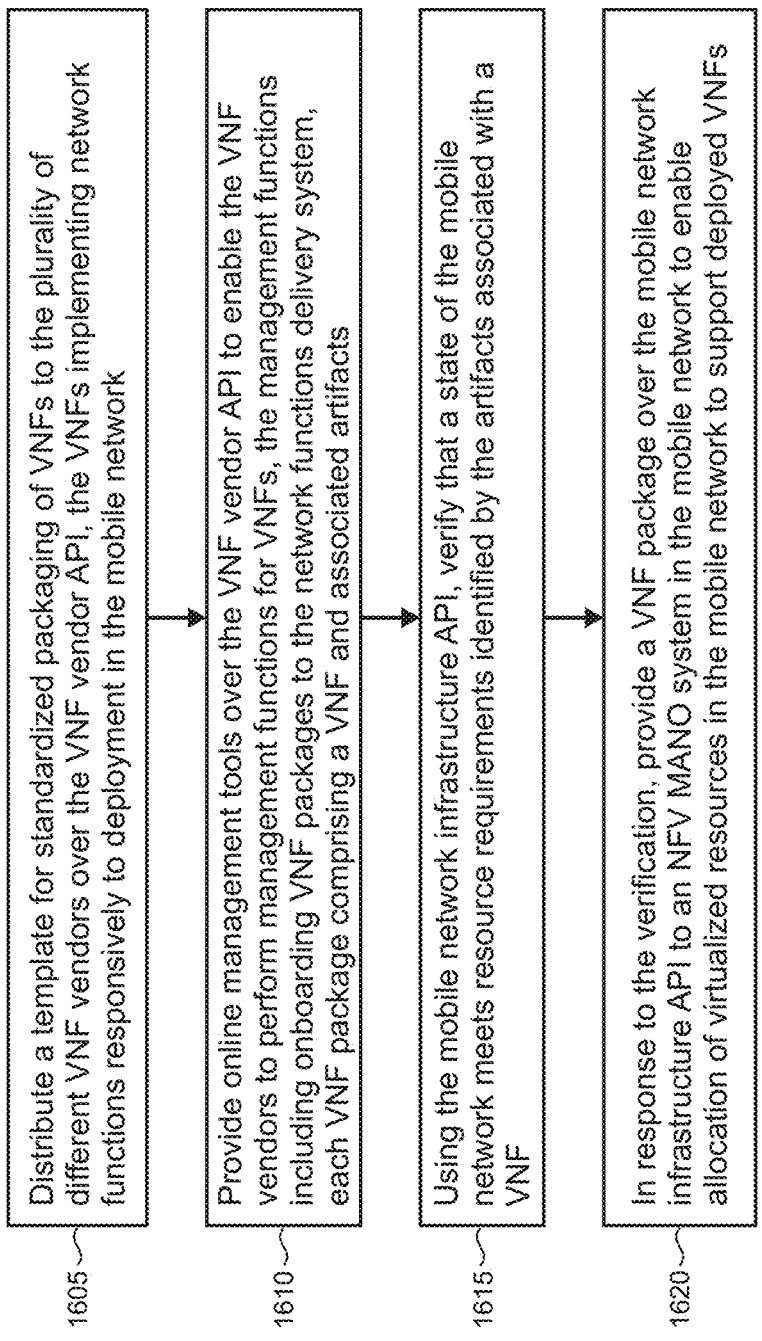

FIG. 16 is a flowchart of an illustrative method 1600 that may be performed by a computing device. Block 1605 includes distributing a template for standardized packaging of VNFs to the plurality of different VNF vendors over a VNF vendor API, in which the VNFs implement network functions responsively to deployment in the mobile network. Block 1610 includes providing online management tools over the VNF vendor API to enable the VNF vendors to perform management functions for VNFs, in which the management functions include onboarding VNF packages to the network functions delivery system where each VNF package comprises a VNF and associated artifacts.

Block 1615 includes, using the mobile network infrastructure API, verifying that a state of the mobile network meets resource requirements identified by the artifacts associated with a VNF. Block 1620 includes, responsively to the verification, providing a VNF package over the mobile network infrastructure API to an NFV MANO system in the mobile network to enable allocation of virtualized resources in the mobile network to support deployed VNFs.

As noted above, the curated deployment environment 910 (FIG. 9) may be implemented as a mobile network slice. With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). Standardized 3GPP network slices of a 5G network include eMBB (enhanced Mobile Broadband) (SST=1), URLLC (ultra-reliable low latency communications) (SST=2), and MIoT (massive Internet of Things) (SST=3) which correspond to the usage scenarios described by ITU-R 2083-0. Additional standardized SST values for V2X (Vehicle-to-Everything) (SST=4) and HMTC (High-Performance Machine Type Communications) (SST=5) are also defined by 3GPP. It may be appreciated that slice service types beyond those having standardized SST values can be defined.

IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 1725, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

Figure 17:
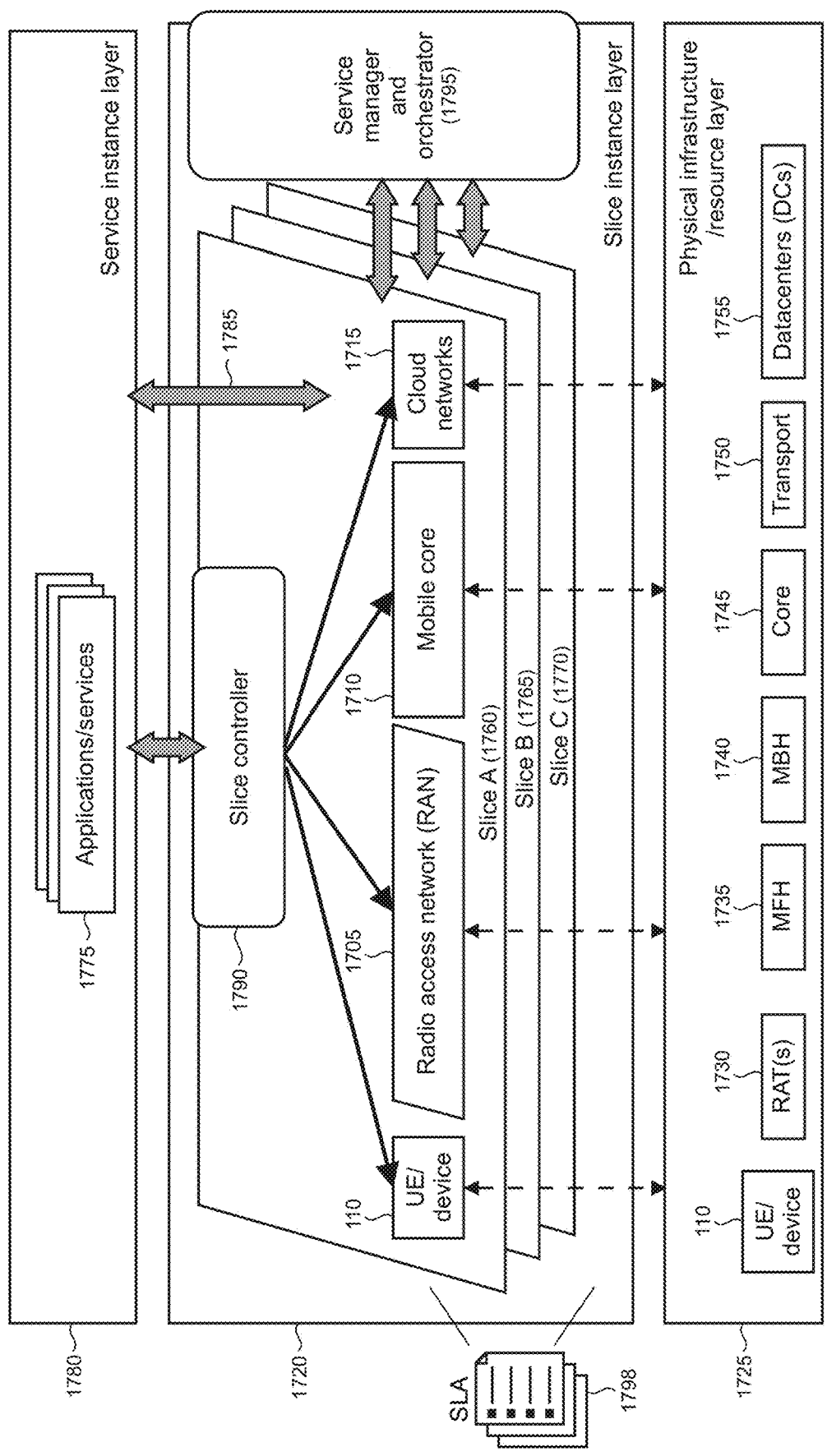
FIG. 17 shows an illustrative layered 5G network slicing framework.

FIG. 17 shows an illustrative layered 5G network slicing framework 1700 that is described in the IMT-2020 recommendation. The framework comprises a radio access network (RAN) 1705, mobile packet core 1710, and cloud networking components 1715 that are logically represented in a network slice instance layer 1720 that sits above a physical infrastructure layer 1725 in the framework. The physical infrastructure layer provides an abstraction of radio, compute, network, and storage resources which may include, for example, one or more RATs 1730, mobile fronthaul (MFH) 1735, mobile backhaul (MBH) 1740, mobile core network 1745, transport 1750, and one or more datacenters (DCs) 1755. In some cases, one or more UE instances may be implemented as resources.

In this illustrative example, the slice instance layer includes three 5G network slices—Slice A 1760, Slice B 1765, and Slice C 1770, but more or fewer slices may be utilized in any given implementation at any given time. These slices may include one or more of pre-defined slice types or comprise different slice types.

Slices may be isolated by logically or physically isolating their underlying resources. The slices can support instances of various applications and/or services (collectively indicated by reference numeral 1775) in a service instance layer 1780, for example, using an application programming interface (API), as representatively indicated by reference numeral 1785. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 1790 is utilized within the slicing framework 1700 to maintain awareness of the application requirements to responsively allocate and manage the virtualized network functions and resources in each slice. A service manager and orchestrator 1795 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 1798 is typically applicable to each of the slices 1760, 1765, and 1770. The applicable SLAs can vary in scope and composition. The slice controller 1790 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present network functions delivery system, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 18:
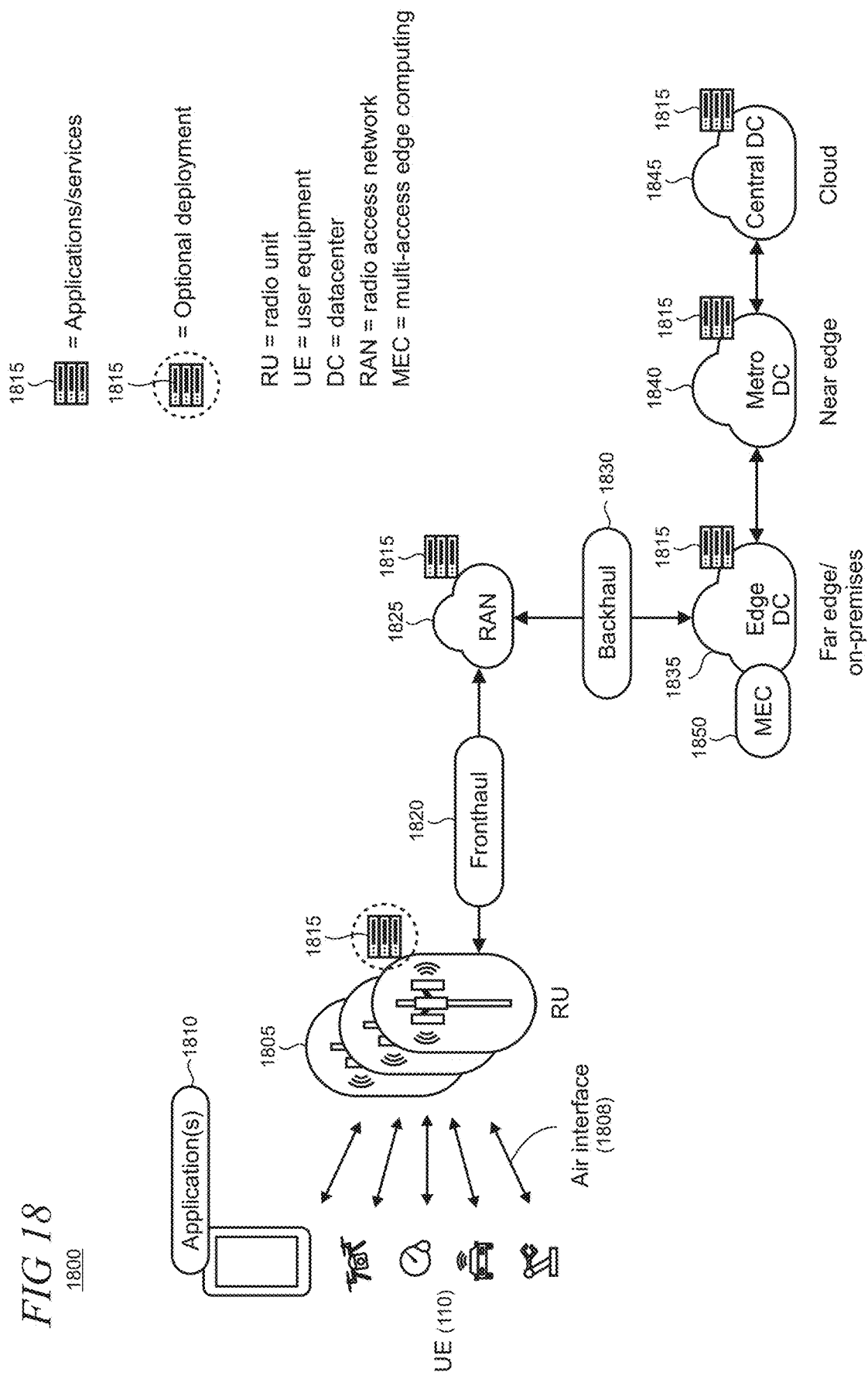
FIG. 18 shows illustrative physical infrastructure in a 5G network architecture.

FIG. 18 shows illustrative physical infrastructure in a 5G network 1800. Multiple instances of a radio unit (RU) 1805 are configured to interact with a diverse population of UE 110 over an air interface 1808. Each UE typically includes one or more local applications 1810 or client-side software/firmware component that is arranged to interface with one or more remote application servers, service providers, or other resources (collectively indicated by reference numeral 1815) and thus require network connectivity to such remote facilities.

The RUs are coupled by the mobile fronthaul 1820 to a RAN 1825. The RAN is coupled by the mobile backhaul 1830 to one or more datacenters (DCs). In this illustrative example, the DCs comprise an edge DC 1835, a metro DC 1840, and a central DC 1845. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 1850.

The application servers 1815 can be located at various points in the network architecture 1800 to meet technical requirements and traffic demands. Typically, the application servers will be physically located closer to the UE 110 in cases where latency is sought to be minimized. However, an operator's application server location criteria may also consider factors such as management ease, scalability, and security, among other factors. In some implementations, an operator may optionally deploy application servers and other resources in the RAN 1825 or RU 1805, as indicated by the dashed circles in FIG. 18.

Figure 19:
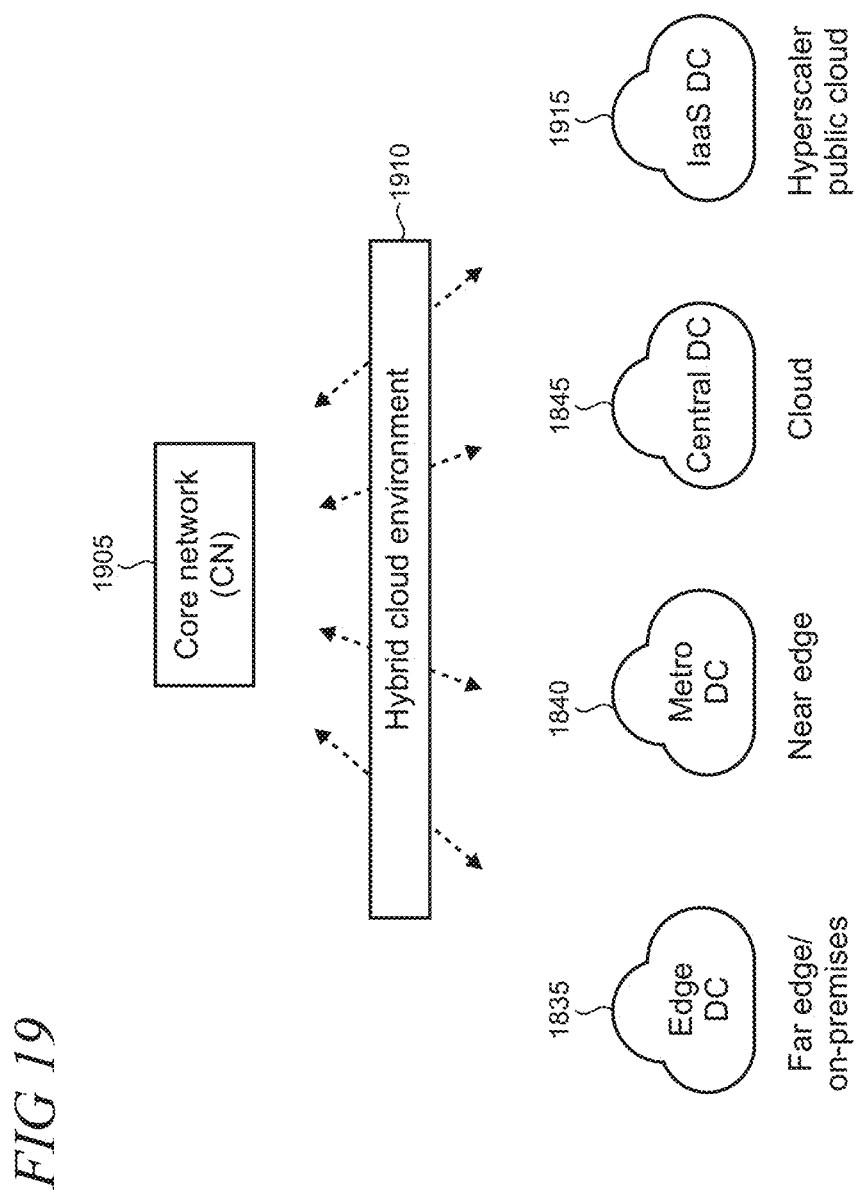
FIG. 19 shows an illustrative 5G core network (CN) that may be implemented using a hybrid cloud environment.

FIG. 19 shows an illustrative 5G core network (CN) 1905 that may be implemented using a hybrid cloud environment 1910 that may comprise a combination of private and/or public cloud networks. In this example, the edge DC 1835, metro DC 1840, and central DC 1845 may be associated with a private cloud. A hyperscaler public cloud supports an IaaS (Infrastructure as a Service) DC 1915. It is emphasized that the present network functions delivery service for mobile networks may be utilized in AN and/or CN portions of a mobile network as implemented in private, public, or hybrid cloud-computing networks.

Figure 20:
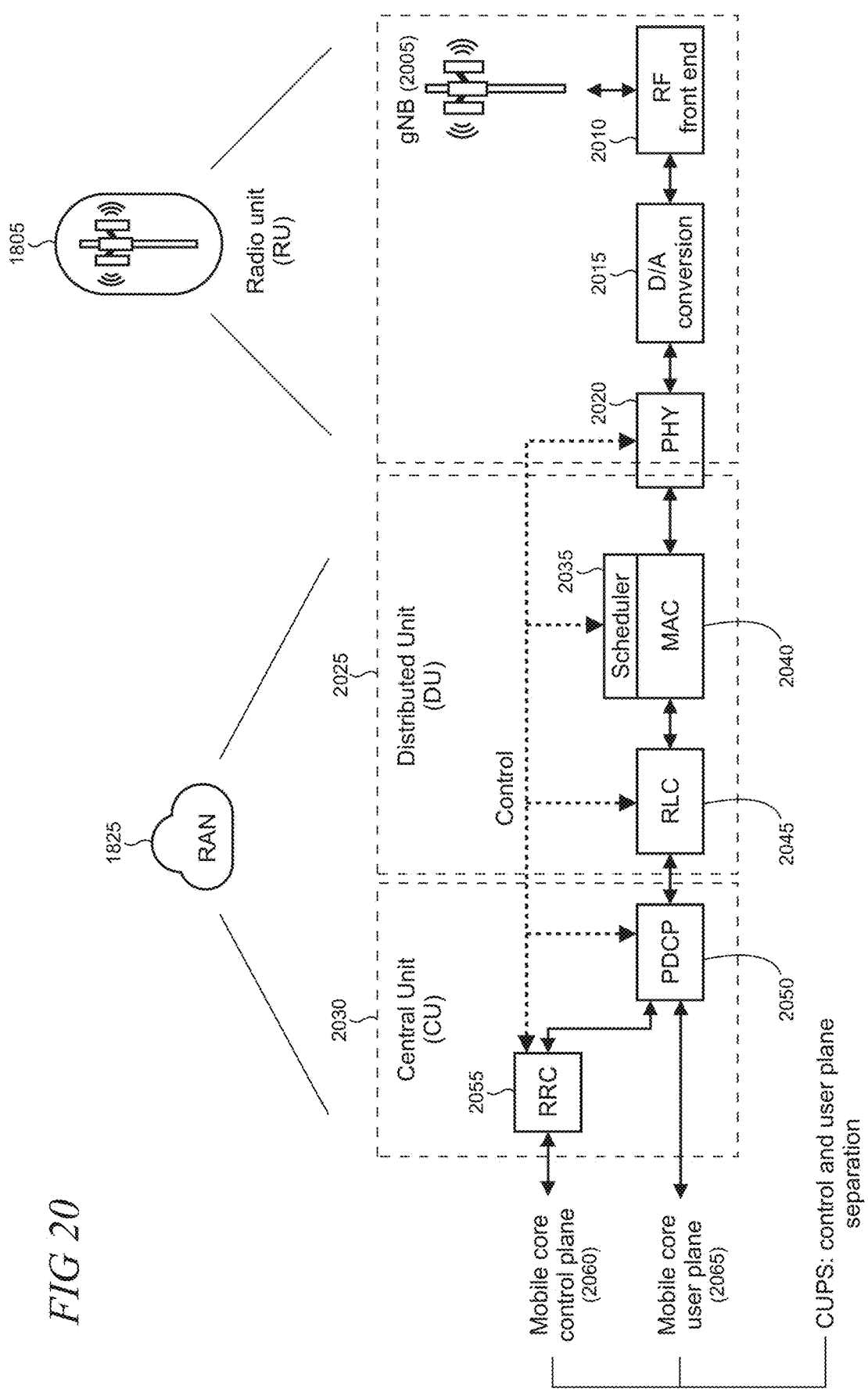
FIG. 20 shows an illustrative 5G radio access network (RAN) and radio unit (RU)

FIG. 20 shows functional blocks of the RAN 1825 and RU 1805. The RU comprises radio transmission points, for example, a next generation Node B, gNB 2005, which handles radio communications with the UE. The gNB is serially coupled to a radio frequency (RF) front end 2010, a digital to analog (D/A) conversion unit 2015, and a portion of the functionality of the physical (PHY) layer 2020 as described in the OSI (Open Systems Interconnection) model.

Under 3GPP and O-RAN (Open RAN) Alliance, the processing pipeline of the RAN 1825 is split into a distributed unit (DU) 2025, and a central unit (CU) 2030. The DU is responsible for real-time layers 1 and 2 (L1 and L2) scheduling functions, and the CU is responsible for non-real-time, higher L2 and L3 functions. Accordingly, the DU comprises a scheduler 2035 located on top of a MAC (Medium Access Control) layer component 2040, an RLC (radio link control) layer component 2045, and parts of a PHY (physical) layer component 2020. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 2030 is configured with a PDCP (Packet Data Convergence Protocol) layer component 2050 and RRC (Radio Resource Control) layer component 2055. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 2060 while the PDCP layer component interfaces with the user plane 2065 to thereby implement the "CUPS" feature of 5G (control and user plane separation).

The split-RAN configuration shown in FIG. 20 enables RAN functionality to be split among physical infrastructure elements in centralized and distributed locations. For example, a single CU 2030 may be configured to serve multiple DUs 2025, each of which in turn serves multiple RUs 1805.

Figure 21:
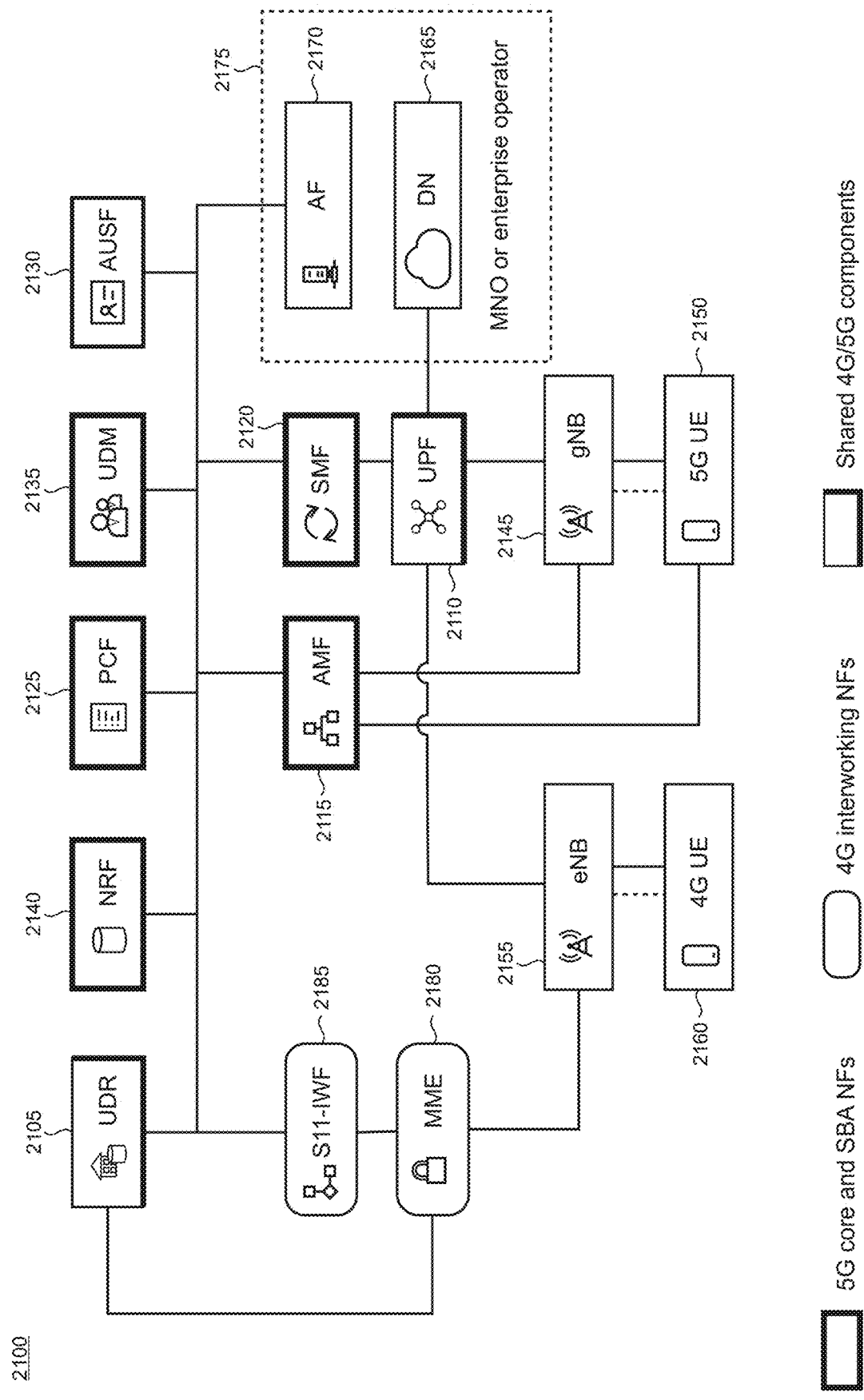
FIG. 21 shows details of an illustrative 5G CN architecture.

FIG. 21 shows details of an illustrative 5G network core architecture 2100 that includes 4G packet core instances to enable some 4G LTE use cases when implementing the present network functions deployment system. With 4G mode, some 5G components such as the Unified Data Repository (UDR) 2105 and UPF 2110 support 4G mode without the need to revert to a legacy 4G stack. Other 5G components in the architecture include Access and Mobility Management Function (AMF) 2115; Session Management Function (SMF) 2120; Policy Control Function (PCF) 2125; Authentication Server Function (AUSF) 2130; Unified Data Management (UDM) 2135; and Network Repository Function (NRF) 2140.

The UPF 2110 interfaces with a gNB 2145 to support 5G UE 2150 and an eNB 2155 to support 4G UE 2160. The UPF further provides an interconnection point between the mobile network infrastructure and an external data network (DN) 2165. Application Function (AF) 2170 provides service or application related information to a VNF service consumer, for example, an MNO or enterprise operator 2175. Other 4G components include a Mobility Management Entity (MME) 2180 and Interworking Function (IWF) 2185.

Figure 22:
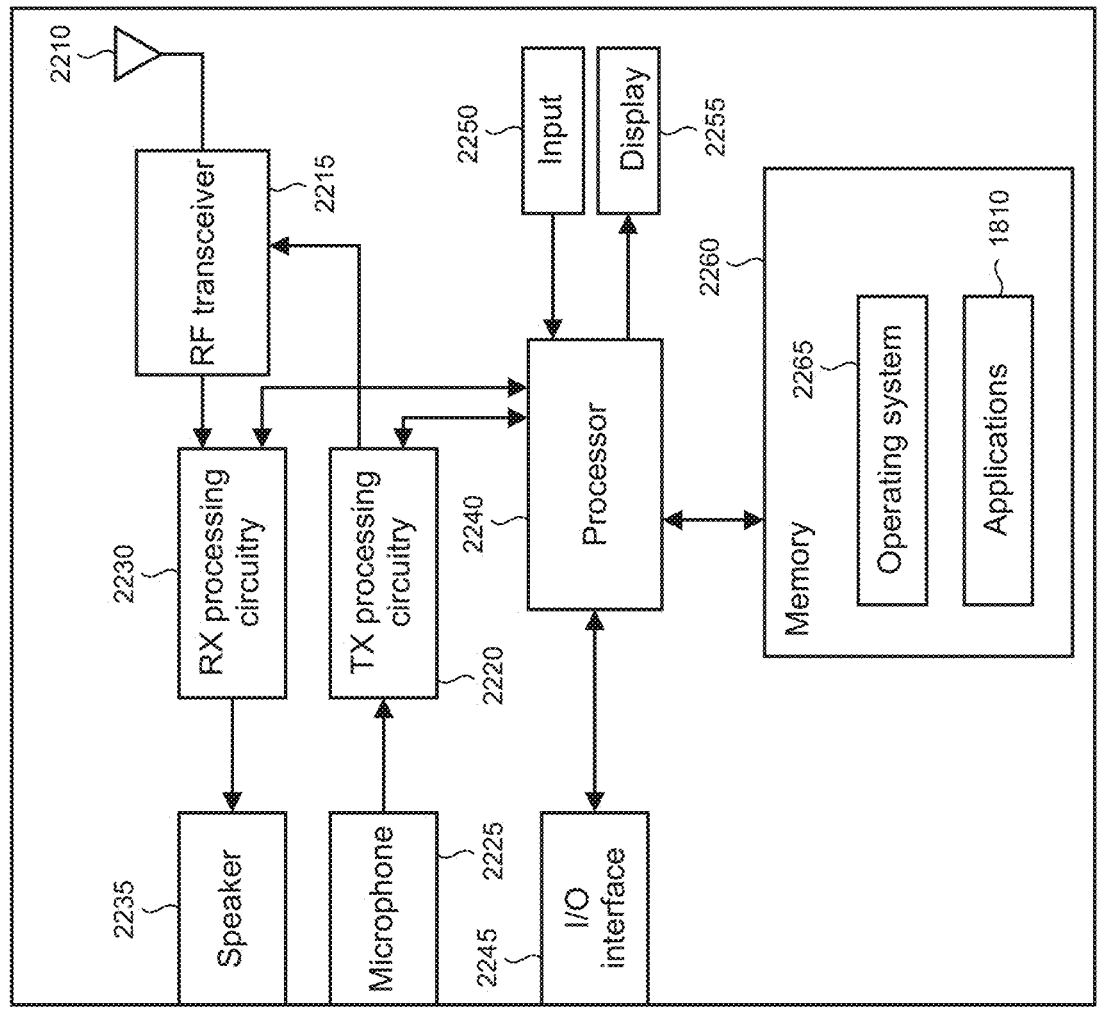
FIG. 22 is a block diagram of an illustrative user equipment (UE) that may be used at least in part to implement the present network functions delivery system.

FIG. 22 is a block diagram of an illustrative UE 110 that may be used at least in part to implement the present network functions delivery system. The embodiment of the UE 110 shown in FIG. 22 is for illustration only, and the UEs 110 shown in the drawings and described in the preceding text may have the same or similar configuration. However, it is noted that UEs may come in a wide variety of configurations, and FIG. 22 does not limit the scope of the present disclosure to any particular implementation of a UE.

The UE 110 includes an antenna 2210, a radio frequency (RF) transceiver 2215, transmit (TX) processing circuitry 2220, a microphone 2225, and receive (RX) processing circuitry 2230. The UE 110 also includes a speaker 2235, a processor 2240, an input/output (I/O) interface 2245, an input device 2250, a display 2255, and a memory 2260. The memory includes an operating system (OS) program 2265 and one or more applications 1810.

The RF transceiver 2215 receives from the antenna 2210, an incoming RF signal transmitted by a gNB of a 5G network. The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 110. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure. The processor can move data into or out of the memory as required by an executing process. In some embodiments, the processor may be configured to execute the applications 1810 based on the OS program 2265 or in response to signals received from gNBs or an operator. The processor is also coupled to the I/O interface 2245, which provides the UE 110 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the UE 110 can typically employ the input device to enter data into the UE. For example, the display can be a liquid crystal display or other display capable of rendering text and/or graphics, video, etc. from web sites, applications, and/or service providers.

The memory 2260 is coupled to the processor 2240. Part of the memory may include a random access memory (RAM), and another part of the memory may include a Flash memory or other read-only memory (ROM).

As described in more detail below, the UE 110 can perform signaling and calculation for channel state information (CSI) reporting. Although FIG. 22 shows one illustrative example of UE 110, it may be appreciated that various changes may be made to the drawing. For example, various components may be combined, further subdivided, or omitted, and additional components may be added according to particular needs. As a particular example, the processor 2240 may be divided into multiple processors, such as one or more CPUs and one or more graphics processing units (GPUs). Also, while FIG. 22 depicts the UE 110 as configured as a mobile device, such as a smartphone, UEs may be configured to operate as other types of portable or stationary devices.

Figure 23:
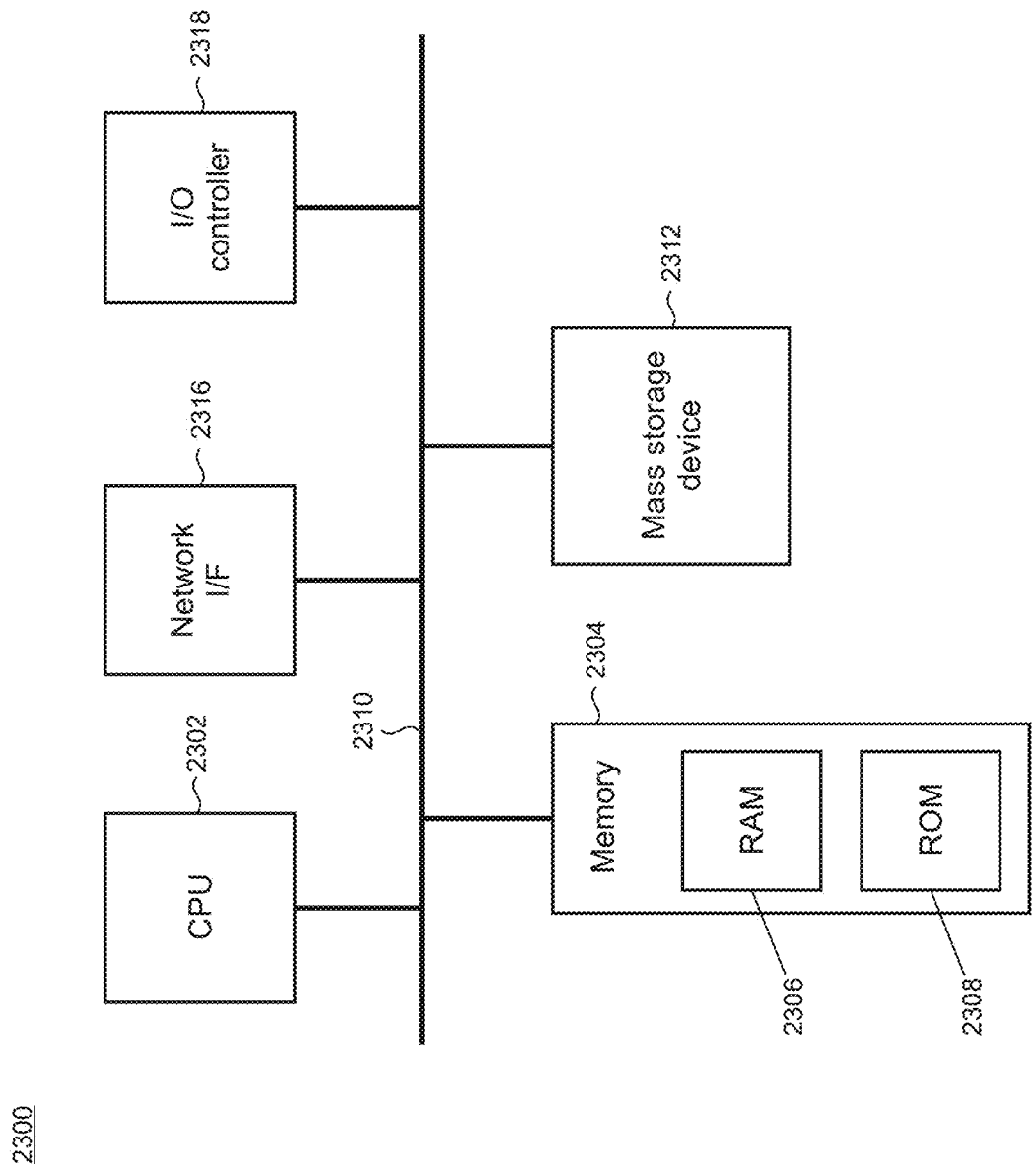
FIG. 23 is a block diagram of an illustrative server or computing device that may be used at least in part to implement the present network functions delivery system.

FIG. 23 shows an illustrative architecture 2300 for a computing device, such as a server, capable of executing the various components described herein for the present network functions delivery system. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
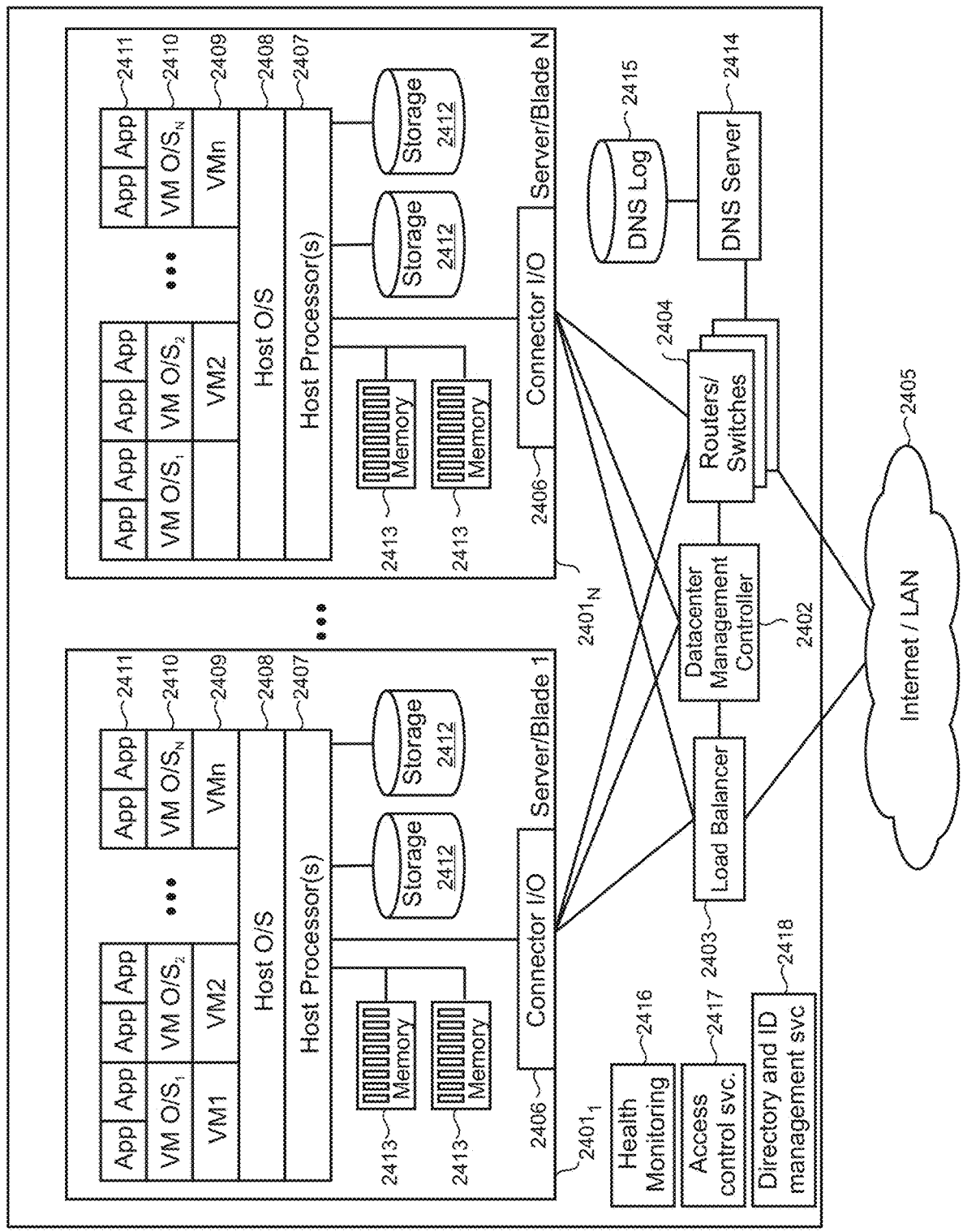
FIG. 24 is a block diagram of an illustrative datacenter that may be used at least in part to implement the present network functions delivery system.

FIG. 24 is a high-level block diagram of an illustrative datacenter 2400 that provides cloud computing services or distributed computing services that may be used to implement the present network functions delivery system. Datacenter 2400 may incorporate one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server may become overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which may be, for example, a local area network (LAN) or the Internet.

Servers 2401 may be standalone computing devices, and/or they may be configured as individual blades in a rack of one or more server devices. Servers 2401 have an input/output (I/O) connector 2406 that manages communication with other database entities. One or more host processors 2407 on each server 2401 run a host operating system (O/S) 2408 that supports multiple virtual machines (VM) 2409. Each VM 2409 may run its own O/S so that each VM O/S 2410 on a server is different, or the same, or a mix of both. The VM O/Ss 2410 may be, for example, different versions of the same O/S (e.g., different VMs running different current and legacy versions of the Windows® operating system). In addition, or alternatively, the VM O/Ss 2410 may be provided by different manufacturers (e.g., some VMs running the Windows® operating system, while other VMs are running the Linux® operating system). Each VM 2409 may also run one or more applications (App) 2411. Each server 2401 also includes storage 2412 (e.g., hard disk drives (HDD)) and memory 2413 (e.g., RAM) that can be accessed and used by the host processors 2407 and VMs 2409 for storing software code, data, etc. In one embodiment, a VM 2409 may employ the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2409 on server $2401_1$ to run their applications 2411. When demand for an application 2411 increases, the datacenter 2400 may activate additional VMs 2409 on the same server $2401_1$ and/or on a new server 2401N as needed. These additional VMs 2409 can be deactivated if demand for the application later drops.

Datacenter 2400 may offer guaranteed availability, disaster recovery, and back-up services. For example, the datacenter may designate one VM 2409 on server $2401_1$ as the primary location for the tenant's application and may activate a second VM 2409 on the same or a different server as a standby or back-up in case the first VM or server $2401_1$ fails. The datacenter management controller 2402 automatically shifts incoming user requests from the primary VM to the back-up VM without requiring tenant intervention.

Although datacenter 2400 is illustrated as a single location, it will be understood that servers 2401 may be distributed to multiple locations across the globe to provide additional redundancy and disaster recovery capabilities. Additionally, datacenter 2400 may be an on-premises, private system that provides services to a single enterprise user or may be a publicly accessible, distributed system that provides services to multiple, unrelated customers and tenants or may be a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

Figure 25:
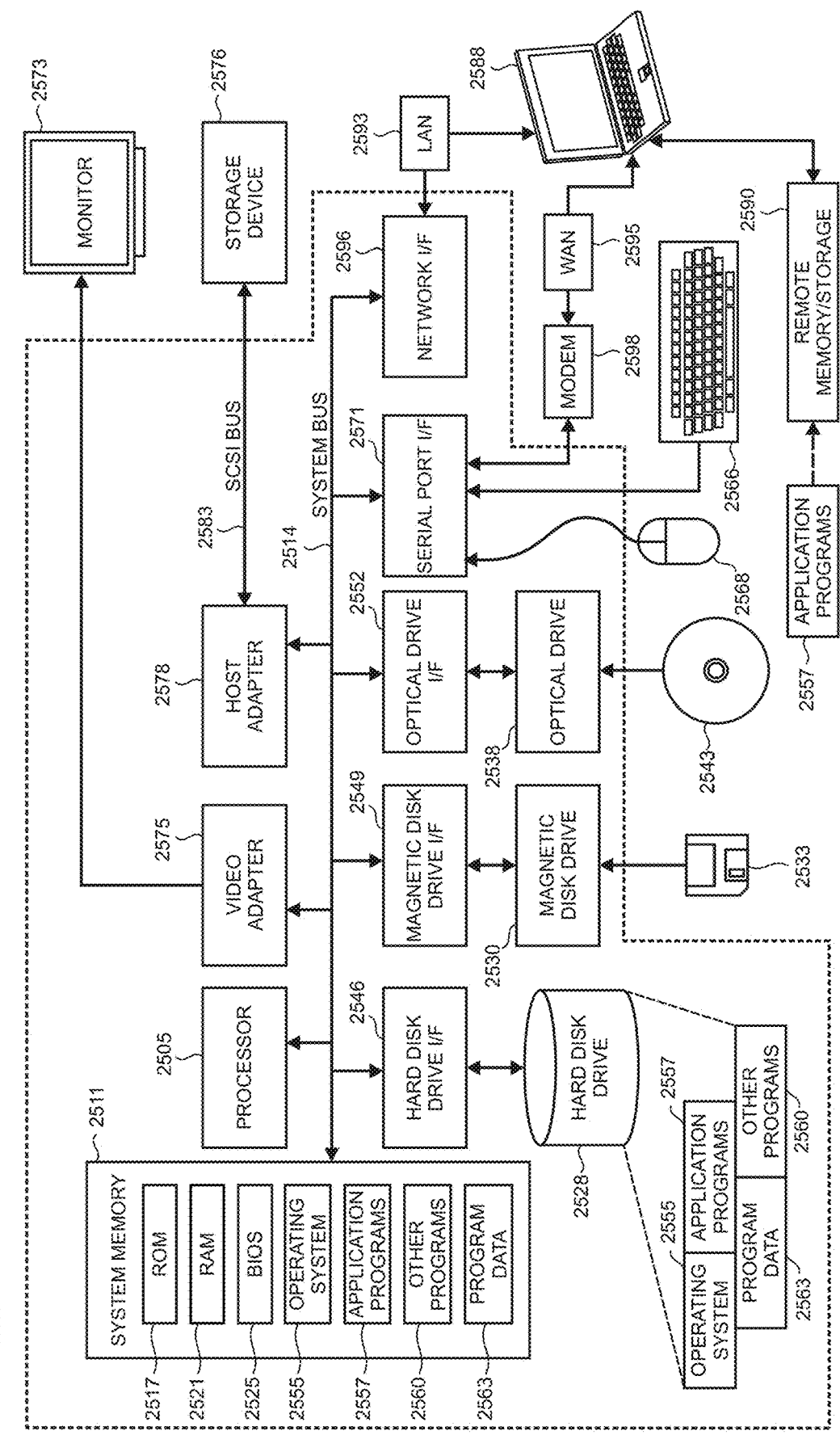
FIG. 25 is a simplified block diagram of an illustrative computer system that may be used at least in part to implement the present network functions delivery system.

FIG. 25 is a simplified block diagram of an illustrative computer system 2500 such as a PC, client machine, or server with which the present network functions delivery system may be implemented. Computer system 2500 includes a processor 2505, a system memory 2511, and a system bus 2514 that couples various system components including the system memory 2511 to the processor 2505. The system bus 2514 may be any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 may further include a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present network functions delivery system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2533, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566 and pointing device 2568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present network functions delivery system.

Various exemplary embodiments of the present network functions delivery system for mobile networks are now presented by way of illustration and not as an exhaustive list of all embodiments. An example includes computer-implemented method for distributing virtualized network functions (VNFs) over a communications network from a network functions delivery system, comprising: receiving a plurality of packaged VNFs from a plurality of VNF vendors, a VNF instantiating a network function in a mobile network when deployed in infrastructure underlying the mobile network; placing the received VNF packages into a catalog that is exposed on a user interface (UI) to the VNF delivery system to a user representing an operator of the mobile network; and in response to selection of a VNF by the user from the exposed catalog, remotely deploying the selected VNF from the network functions delivery system to a curated deployment environment of the mobile network infrastructure to implement the mobile network function, wherein the curated deployment environment is controllable by the network functions delivery system in accordance with predetermined mobile network policies and wherein the curated deployment environment includes one or more pre-provisioned resources supporting VNF deployment and configuration by the network functions delivery system.

In another example, the VNF packages from the VNF vendors comply with a VNF template provided to the VNF vendors from the network functions delivery system. In another example, each of the VNF packages includes information about a respective associated VNF, the information including infrastructure requirements. In another example, the infrastructure requirements pertain to one or more of compute, memory, or storage resources available on the mobile network infrastructure. In another example, the information pertains to a number of end-users supportable by a network function instantiated by a VNF in the mobile network. In another example, the VNF package further includes one of metadata for package onboarding, a VNF image file, one or more application programming interfaces, scripts for VNF lifecycle management, or vendor-specific files. In another example, the user represents a mobile network service provider or represents an operator of an enterprise. In another example, the VNF packages exposed on the UI are available for operations on diverse cloud computing platforms that are implemented using one or more of private cloud, public cloud, or hybrid cloud. In another example, the mobile network comprises one of a fourth generation (4G) mobile network, a fifth generation (5G) mobile network, or a combined 4G and 5G mobile network.

A further example includes one or more hardware-based non-transitory computer-readable memory devices storing computer-executable instructions which, upon execution by one or more processors disposed in a computing device, cause the computing device to: instantiate a network functions delivery system that is configured to remotely deploy virtualized network functions (VNFs) in a mobile network comprising network functions virtualization infrastructure (NFVI) to implement network functions in the mobile network, the mobile network being represented by one or more customers; enable the network functions delivery system to monitor current availability of resources on the NFVI; maintain a database storing a catalog of VNFs from a plurality of third-party vendors, the catalog exposing a user interface (UI) to the one or more customers configured to enable browsing of VNF descriptive information and selection of VNFs for deployment; register the plurality of third-party vendors with the network functions delivery system, wherein the plurality of third-party vendors provides a plurality of VNFs for listing in the catalog, the VNFs being packaged for the network functions delivery system, each VNF package comprising a software image to run a VNF, a VNF descriptor defining metadata to onboard the VNF package to the network functions delivery system, specified NFVI resource requirements, and artifacts for managing VNFs when deployed, and wherein the plurality of third-party vendors provides the VNF descriptive information for inclusion in the catalog; and in response to customer selection of a VNF for deployment, compare the specified NFVI resource requirements with currently available resources on the NFVI based on the monitoring.

In another example, the executed instructions further cause the computing device to deploy the VNF selected by the customer responsively to the comparison indicating that currently available resources on the NFVI meet or exceed the specified NFVI resource requirements. In another example, the executed instructions further cause the computing device to reject deployment of the VNF selected by the customer responsively to the comparison indicating that currently available resources on the NFVI are insufficient to meet the specified NFVI resource requirements. In another example, the executed instructions further cause the computing device to provide information through the UI pertaining to resolution of the insufficiency of currently available resources on the NFVI. In another example, the NFVI comprises one or more cloud-computing platforms.

A further example includes a computing device used by a virtualized network functions (VNF) delivery system, comprising: one or more processors; memory in electronic communication with the one or more processors; a VNF vendor application programming interface (API) stored in the memory configured for facilitating interactions between the network functions delivery system and a plurality of computing systems respectively associated with a plurality of different VNF vendors; a mobile network infrastructure API stored in the memory configured for facilitating interactions between the network functions delivery system infrastructure underlying a mobile network comprising one or more of private or public cloud computing infrastructure utilized to implement an access network or core network of the mobile network; and one or more hardware-based non-transitory computer-readable storage devices having computer-executable instructions stored thereon which, when executed by the one or more processors, cause the computing device to distribute a template for standardized packaging of VNFs to the plurality of different VNF vendors over the VNF vendor API, the VNFs implementing network functions responsively to deployment in the mobile network; provide online management tools over the VNF vendor API to enable the VNF vendors to perform management functions for VNFs, the management functions including onboarding VNF packages to the network functions delivery system, each VNF package comprising a VNF and associated artifacts; using the mobile network infrastructure API, verify that a state of the mobile network meets resource requirements identified by the artifacts associated with a VNF; and in response to the verification, provide a VNF package over the mobile network infrastructure API to an NFV (network functions virtualization) management and orchestration (MANO) system in the mobile network to enable allocation of virtualized resources in the mobile network to support deployed VNFs.

In another example, the management functions include one of VNF software image management, VNF package management, VNF lifecycle management, inter-VNF connectivity management, or VNF performance management. In another example, the state of the mobile network comprises one or more of a level of available compute, memory, storage, or networking resources, or a number of end-users supportable on the mobile network. In another example, the mobile network infrastructure API is configured to enable communications between the network functions delivery system and a curated deployment environment of the mobile network. In another example, the artifacts provide information to deploy the VNF in the mobile network or manage the deployed VNF in the mobile network. In another example, each VNF package is digitally signed by an associated VFN vendor and is immutable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for distributing virtualized network functions (VNFs) over a communications network from a network functions delivery system, comprising:
   receiving a plurality of packaged VNFs from a plurality of VNF vendors, a VNF instantiating a network function in a mobile network when deployed in infrastructure underlying the mobile network;
   placing the received VNF packages into a catalog that is exposed on a user interface (UI) to the VNF delivery system to a user representing an operator of the mobile network; and
   in response to selection of a VNF by the user from the exposed catalog, remotely deploying the selected VNF from the network functions delivery system to a curated deployment environment of the mobile network infrastructure to implement the mobile network function,
   wherein the curated deployment environment is controllable by the network functions delivery system in accordance with predetermined mobile network policies and wherein the curated deployment environment includes one or more pre-provisioned resources supporting VNF deployment and configuration by the network functions delivery system.

2. The computer-implemented method of claim 1 in which the VNF packages from the VNF vendors comply with a VNF template provided to the VNF vendors from the network functions delivery system.

3. The computer-implemented method of claim 1 in which each of the VNF packages includes information about a respective associated VNF, the information including infrastructure requirements.

4. The computer-implemented method of claim 3 in which the infrastructure requirements pertain to one or more of compute, memory, or storage resources available on the mobile network infrastructure.

5. The computer-implemented method of claim 3 in which the information pertains to a number of end-users supportable by a network function instantiated by a VNF in the mobile network.

6. The computer-implemented method of claim 1 in which the VNF package further includes one of metadata for package onboarding, a VNF image file, one or more application programming interfaces, scripts for VNF lifecycle management, or vendor-specific files.

7. The computer-implemented method of claim 1 in which the user represents a mobile network service provider or represents an operator of an enterprise.

8. The computer-implemented method of claim 1 in which the VNF packages exposed on the UI are available for operations on diverse cloud computing platforms that are implemented using one or more of private cloud, public cloud, or hybrid cloud.

9. The computer-implemented method of claim 1 in which the mobile network comprises one of a fourth generation (4G) mobile network, a fifth generation (5G) mobile network, or a combined 4G and 5G mobile network.

10. One or more hardware-based non-transitory computer-readable memory devices storing computer-executable instructions which, upon execution by one or more processors disposed in a computing device, cause the computing device to:
    instantiate a network functions delivery system that is configured to remotely deploy virtualized network functions (VNFs) in a mobile network comprising network functions virtualization infrastructure (NFVI) to implement network functions in the mobile network, the mobile network being represented by one or more customers;
    enable the network functions delivery system to monitor current availability of resources on the NFVI;
    maintain a database storing a catalog of VNFs from a plurality of third-party vendors, the catalog exposing a user interface (UI) to the one or more customers configured to enable browsing of VNF descriptive information and selection of VNFs for deployment;
    register the plurality of third-party vendors with the network functions delivery system, wherein the plurality of third-party vendors provides a plurality of VNFs for listing in the catalog, the VNFs being packaged for the network functions delivery system, each VNF package comprising a software image to run a VNF, a VNF descriptor defining metadata to onboard the VNF package to the network functions delivery system, specified NFVI resource requirements, and artifacts for managing VNFs when deployed, and wherein the plurality of third-party vendors provides the VNF descriptive information for inclusion in the catalog; and
    in response to customer selection of a VNF for deployment, compare the specified NFVI resource requirements with currently available resources on the NFVI based on the monitoring.

11. The one or more hardware-based non-transitory computer-readable memory devices of claim 10 in which the executed instructions further cause the computing device to deploy the VNF selected by the customer responsively to the comparison indicating that currently available resources on the NFVI meet or exceed the specified NFVI resource requirements.

12. The one or more hardware-based non-transitory computer-readable memory devices of claim 11 in which the NFVI comprises one or more cloud-computing platforms.

13. The one or more hardware-based non-transitory computer-readable memory devices of claim 10 in which the executed instructions further cause the computing device to reject deployment of the VNF selected by the customer responsively to the comparison indicating that currently available resources on the NFVI are insufficient to meet the specified NFVI resource requirements.

14. The one or more hardware-based non-transitory computer-readable memory devices of claim 13 in which the executed instructions further cause the computing device to provide information through the UI pertaining to resolution of the insufficiency of currently available resources on the NFVI.

15. A computing device used by a virtualized network functions (VNF) delivery system, comprising:
one or more processors;
memory in electronic communication with the one or more processors;
a VNF vendor application programming interface (API) stored in the memory configured for facilitating interactions between the network functions delivery system and a plurality of computing systems respectively associated with a plurality of different VNF vendors;
a mobile network infrastructure API stored in the memory configured for facilitating interactions between the network functions delivery system infrastructure underlying a mobile network comprising one or more of private or public cloud computing infrastructure utilized to implement an access network or core network of the mobile network; and
one or more hardware-based non-transitory computer-readable storage devices having computer-executable instructions stored thereon which, when executed by the one or more processors, cause the computing device to
distribute a template for standardized packaging of VNFs to the plurality of different VNF vendors over the VNF vendor API, the VNFs implementing network functions responsively to deployment in the mobile network;
provide online management tools over the VNF vendor API to enable the VNF vendors to perform management functions for VNFs, the management functions including onboarding VNF packages to the network functions delivery system, each VNF package comprising a VNF and associated artifacts;
using the mobile network infrastructure API, verify that a state of the mobile network meets resource requirements identified by the artifacts associated with a VNF; and
in response to the verification, provide a VNF package over the mobile network infrastructure API to an NFV (network functions virtualization) management and orchestration (MANO) system in the mobile network to enable allocation of virtualized resources in the mobile network to support deployed VNFs.

16. The computing device of claim 15 in which the management functions include one of VNF software image management, VNF package management, VNF lifecycle management, inter-VNF connectivity management, or VNF performance management.

17. The computing device of claim 16 in which the state of the mobile network comprises one or more of a level of available compute, memory, storage, or networking resources, or a number of end-users supportable on the mobile network.

18. The computing device of claim 16 in which the mobile network infrastructure API is configured to enable communications between the network functions delivery system and a curated deployment environment of the mobile network.

19. The computing device of claim 15 in which the artifacts provide information to deploy the VNF in the mobile network or manage the deployed VNF in the mobile network.

20. The computing device of claim 15 in which each VNF package is digitally signed by an associated VFN vendor and is immutable.

\* \* \* \* \*